(12) United States Patent
Yamane

(10) Patent No.: US 12,163,044 B2
(45) Date of Patent: Dec. 10, 2024

(54) WATER- AND OIL-REPELLING MEMBER AND WATER- AND OIL-REPELLING MEMBER PRODUCTION METHOD

(71) Applicant: SHIN-ETSU CHEMICAL CO., LTD., Tokyo (JP)

(72) Inventor: Yuji Yamane, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 234 days.

(21) Appl. No.: 17/636,559

(22) PCT Filed: Jul. 28, 2020

(86) PCT No.: PCT/JP2020/028839
§ 371 (c)(1),
(2) Date: Feb. 18, 2022

(87) PCT Pub. No.: WO2021/033498
PCT Pub. Date: Feb. 25, 2021

(65) Prior Publication Data
US 2022/0306892 A1    Sep. 29, 2022

(30) Foreign Application Priority Data
Aug. 20, 2019   (JP) .................................. 2019-150409

(51) Int. Cl.
*C09D 171/02* (2006.01)
*B05D 7/00* (2006.01)
*C09D 5/00* (2006.01)
*C09D 183/06* (2006.01)

(52) U.S. Cl.
CPC ........... *C09D 171/02* (2013.01); *B05D 7/546* (2013.01); *C09D 5/002* (2013.01); *C09D 183/06* (2013.01)

(58) Field of Classification Search
CPC ..... C09D 171/02; C09D 5/002; C09D 183/06
USPC ........................................................ 428/216
See application file for complete search history.

(56) References Cited

U.S. PATENT DOCUMENTS

| | | |
|---|---|---|
| 2007/0134488 A1 | 6/2007 | Hayakawa |
| 2007/0149746 A1 | 6/2007 | Yamane et al. |
| 2007/0197758 A1 | 8/2007 | Yamane et al. |
| 2008/0071042 A1 | 3/2008 | Yamane et al. |
| 2009/0297828 A1 | 12/2009 | Shenderova et al. |
| 2010/0029889 A1 | 2/2010 | Yamane et al. |
| 2010/0076211 A1 | 3/2010 | Yamane et al. |
| 2011/0098402 A1 | 4/2011 | Yamane et al. |
| 2014/0113145 A1 | 4/2014 | Yamane et al. |
| 2014/0147680 A1 | 5/2014 | Yamane et al. |
| 2014/0302332 A1 | 10/2014 | Murotani et al. |
| 2015/0072161 A1* | 3/2015 | Mayo ............... C09D 5/084 524/106 |
| 2015/0307719 A1 | 10/2015 | Mitsuhashi et al. |
| 2015/0337430 A1 | 11/2015 | Yoshida et al. |
| 2019/0225822 A1 | 7/2019 | Sigel et al. |
| 2020/0254482 A1* | 8/2020 | Yamane ............ B32B 27/285 |

FOREIGN PATENT DOCUMENTS

| | | |
|---|---|---|
| EP | 2 762 226 A1 | 8/2014 |
| JP | 2007-197425 A | 8/2007 |
| JP | 2007-297543 A | 11/2007 |
| JP | 2007-297589 A | 11/2007 |
| JP | 2008-88412 A | 4/2008 |
| JP | 2008-144144 A | 6/2008 |
| JP | 2010-31184 A | 2/2010 |
| JP | 2010-47516 A | 3/2010 |
| JP | 2011-116947 A | 6/2011 |
| JP | 2011-178835 A | 9/2011 |
| JP | 2012-45840 A | 3/2012 |
| JP | 2012-96540 A | 5/2012 |
| JP | 2013-253228 A | 12/2013 |
| JP | 2014-40092 A | 3/2014 |
| JP | 2014-84405 A | 5/2014 |
| JP | 2014-105235 A | 6/2014 |
| JP | 2014-218639 A | 11/2014 |
| JP | 2016-537481 A | 12/2016 |

(Continued)

OTHER PUBLICATIONS

International Search Report (PCT/ISA/210) issued in PCT/JP2020/028839, dated Oct. 6, 2020.

(Continued)

*Primary Examiner* — Tahseen Khan
(74) *Attorney, Agent, or Firm* — Birch, Stewart, Kolasch & Birch, LLP

(57) ABSTRACT

The invention provides a water- and oil-repelling member having a primer layer as a first layer on at least one surface of a base material and further having a water- and oil-repelling layer as a second layer on the outer surface of the primer layer. The primer layer comprises a layer containing nano-diamonds and having a film thickness of 0.5 to 500 nm, the main component being an organic silicon compound having a plurality of silanol groups within a molecule. The water- and oil-repelling layer comprises a layer having a film thickness of 0.5 to 30 nm, the main component being a cured product of a hydrolysable fluorine-containing compound. The water- and oil-repelling member can stably and simply impart a water- and oil-repelling coat having excellent abrasion resistance to various base materials. In addition, the primer layer and the water- and oil-repelling layer can be coated even in a room-temperature (25° C.) process.

13 Claims, No Drawings

(56) References Cited

FOREIGN PATENT DOCUMENTS

| WO | WO 2010/038648 A1 | 4/2010 | |
|---|---|---|---|
| WO | WO 2013/121984 A1 | 8/2013 | |
| WO | WO 2014/097388 A1 | 6/2014 | |
| WO | WO-2019069642 A1 * | 4/2019 | ............... B05D 1/36 |
| WO | WO 2019/154816 A1 | 8/2019 | |

OTHER PUBLICATIONS

Written Opinion of the International Searching Authority (PCT/ISA/237) issued in PCT/JP2020/028839, dated Oct. 6, 2020.

* cited by examiner

WATER- AND OIL-REPELLING MEMBER AND WATER- AND OIL-REPELLING MEMBER PRODUCTION METHOD

TECHNICAL FIELD

The present invention relates to a water/oil-repellent member and a method for producing the water/oil-repellent member, and more particularly relates to a water/oil-repellent member in which a primer layer is formed using a composition containing an organosilicon compound having a plurality of silanol groups in a molecule and nanodiamond between a substrate and a water/oil-repellent layer, and a method for producing the water/oil-repellent member.

BACKGROUND ART

In recent years, in order to improve appearance and visibility, there has been an increasing demand for a technique that makes it difficult to be stained and a technique that makes it easy to remove stains. In particular, sebum and oil stain are likely to adhere to surfaces of a spectacle lens, a smartphone, a wearable terminal, a car navigation system, a housing of an electronic device, and a body of a kitchen table and a transportation device, and thus it is desired to provide a water/oil-repellent layer. However, a compound having a fluorine group used as a water/oil-repellent agent has very small surface free energy, and has non-stickiness and non-adhesiveness to various substrates. Therefore, it is difficult to directly adhere the water/oil-repellent agent to the substrate.

In order to solve such a problem, for example, JP-A 2011-116947 (Patent Document 1) discloses a fluorooxyalkylene group-containing polymer composition having the following average composition formula as a treatment agent capable of subjecting the surface of a substrate such as glass to a water/oil-repellent treatment.

$$A\text{-Rf}^1\text{—B} \quad \text{[Chem. 1]}$$

wherein $Rf^1$ is a divalent linear fluorooxyalkylene group containing 5 to 100 repeating units of $-C_dF_{2d}O-$ (d is an integer of 1 to 6, and may be different for each repeating unit), and A and B are mutually independently an $Rf^2$ group or a group having the following formula:

[Chem. 2]

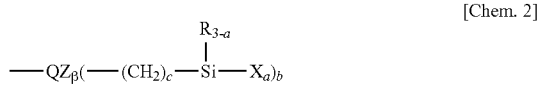

$Rf^2$ is F, H, a monovalent fluorine-containing group whose terminal is a $-CF_3$ group or a $-CF_2H$ group, Q is a divalent organic group, Z is a 2- to 7-valent organopolysiloxane residue having a siloxane bond, R is an alkyl group having 1 to 4 carbon atoms or a phenyl group, X is a hydrolyzable group, a is an integer of 2 or 3, b is an integer of 1 to 6, c is an integer of 1 to 5, and β is an integer of 0 or 1.

However, while the treatment agent proposed in Patent Document 1 exhibits relatively excellent durability on a substrate having many silanol groups represented by glass or the like, it is difficult to obtain excellent adhesion to metals, metal oxides, resins, and the like.

As a method for improving adhesion, a method of providing a $SiO_2$ layer as a primer layer by a dry method (vapor deposition method or sputtering method) has been disclosed (WO 2014/097388: Patent Document 2). It has been shown that a water/oil-repellent layer having excellent durability can be formed by using this method. However, its application range is limited in terms of productivity and production cost because it is necessary to perform processing in a vacuum and a large-scale device is required to coat a large substrate.

On the other hand, a polysilazane solution capable of providing a primer layer by a wet method has been disclosed (WO 2010/038648: Patent Document 3). It utilizes that, after application of the polysilazane solution, the polysilazane solution reacts with moisture to be converted into silica glass. This method is superior to the dry method in that a vacuum process is not used. However, since long-time high temperature heating and humidification are required in order to stabilize adhesion of the water/oil-repellent layer, there is a problem in terms of productivity and cost, and there is a problem that a substrate applicable from the viewpoint of heat resistance is limited.

Note that, as conventional techniques related to the present invention, the following documents can be cited together with the above-described documents.

PRIOR ART DOCUMENTS

Patent Documents

Patent Document 1: JP-A 2011-116947
Patent Document 2: WO 2014/097388
Patent Document 3: WO 2010/038648
Patent Document 4: JP-A 2007-197425
Patent Document 5: JP-A 2007-297589
Patent Document 6: JP-A 2007-297543
Patent Document 7: JP-A 2008-088412
Patent Document 8: JP-A 2008-144144
Patent Document 9: JP-A 2010-031184
Patent Document 10: JP-A 2010-047516
Patent Document 11: JP-A 2011-178835
Patent Document 12: JP-A 2014-084405
Patent Document 13: JP-A 2014-105235
Patent Document 14: JP-A 2013-253228
Patent Document 15: JP-A 2014-218639
Patent Document 16: WO 2013/121984

SUMMARY OF INVENTION

Technical Problem

The present invention has been made in view of the above circumstances, and an object thereof is to provide a water/oil-repellent member having excellent abrasion resistance, and a method for producing a water/oil-repellent member in which a water/oil-repellent layer having excellent abrasion resistance is formed on various substrates by a wet method or a dry method.

Solution to Problem

As a result of intensive studies to achieve the above object, the present inventors have found that a water/oil-repellent member in which a primer layer (first layer) having a specific thickness which contains an organosilicon compound having a plurality of silanol groups in a molecule as a principal component and contains nanodiamond is provided on at least one surface of various substrates by the following method and then a water/oil-repellent layer (second layer) having a specific thickness which contains a cured product of a hydrolyzable fluorine-containing compound as a principal component is provided on an outer surface of the primer layer, obtained by a method including steps of wet-coating a solution (composition) containing an organosilicon compound having a plurality of silanol groups in a molecule, nanodiamond and a solvent on at least one surface of a substrate; drying the solvent to form and laminate a primer layer on at least one surface of the substrate; wet-coating a solution containing a hydrolyzable fluorine-containing compound and a solvent on an outer surface of the primer layer, and then drying the solvent, or dry-coating a hydrolyzable fluorine-containing compound obtained by evaporating the solvent from the solution; and curing the hydrolyzable fluorine-containing compound to form and laminate a water/oil-repellent layer on the outer surface of the primer layer, or the like, can stably and easily apply a water/oil-repellent film having excellent abrasion resistance to various substrates, and further, the primer layer and the water/oil-repellent layer can be applied even in a room temperature (25° C.) process, and have completed the present invention.

That is, the present invention provides a water/oil-repellent member and a method for producing the water/oil-repellent member described below.

[1]
A water/oil-repellent member having a primer layer as a first layer on at least one surface of a substrate, and further having a water/oil-repellent layer as a second layer on an outer surface of the primer layer, wherein the primer layer is composed of a layer having a film thickness of 0.5 to 500 nm which contains an organosilicon compound having a plurality of silanol groups in a molecule as a principal component and contains nanodiamond, and the water/oil-repellent layer is composed of a layer having a film thickness of 0.5 to 30 nm which contains a cured product of a hydrolyzable fluorine-containing compound as a principal component.

[2]
The water/oil-repellent member according to [1], wherein the organosilicon compound having a plurality of silanol groups in a molecule is a hydrolyzed partial condensate of tetraalkoxysilane.

[3]
The water/oil-repellent member according to [1] or [2], wherein the hydrolyzable fluorine-containing compound is a fluorooxyalkylene group-containing hydrolyzable organosilicon compound having at least one hydrolyzable silyl group at at least one molecular chain terminal and having a divalent linear perfluorooxyalkylene polymer residue to which a plurality of one or more kinds of repeating units of —$C_jF_{2j}$O— (j is an integer of 1 or more) are arranged.

[4]
The water/oil-repellent member according to [3], wherein the hydrolyzable silyl group is a group selected from alkoxy groups having 1 to 12 carbon atoms, alkoxyalkoxy groups having 2 to 12 carbon atoms, acyloxy groups having 1 to 10 carbon atoms, alkenyloxy groups having 2 to 10 carbon atoms, silyl groups having a halogen group or an amino group, and a silazane group.

[5]
The water/oil-repellent member according to [3] or [4], wherein the divalent linear perfluorooxyalkylene polymer residue is a group of —$(CF_2)_d$—O—$(CF_2O)_p(CF_2CF_2O)_q(CF_2CF_2CF_2O)_r(CF_2CF_2CF_2CF_2O)_s(CF(CF_3)CF_2O)_t(CF_2)_d$—, wherein p, q, r, s, and t are each independently an integer of 0 to 200, p+q+r+s+t is 3 to 500, each of repeating units shown in parentheses appended with p, q, r, s, and t may be randomly arranged, d is independently an integer of 0 to 8, and the unit may be linear or branched.

[6]
The water/oil-repellent member according to any one of [1] to [5], wherein the hydrolyzable fluorine-containing compound is at least one selected from fluorine-containing hydrolyzable organosilicon compounds having the following general formulas (1) to (5):

(A-Rf)$_\alpha$ZW$_\beta$     (1)

Rf—(ZW$_\beta$)$_2$     (2)

Z'—(Rf—ZW$_\beta$)$_\gamma$     (3)

wherein Rf is independently a divalent linear perfluorooxyalkylene polymer residue of —$(CF_2)_d$—O—$(CF_2O)_p(CF_2CF_2O)_q(CF_2CF_2CF_2O)_r(CF_2CF_2CF_2CF_2O)_s(CF(CF_3)CF_2O)_t(CF_2)_d$—, p, q, r, s, and t are each independently an integer of 0 to 200, p+q+r+s+t is 3 to 500, each repeating unit shown in parentheses appended with p, q, r, s, and t may be randomly arranged, d is independently an integer of 0 to 8, and the unit may be linear or branched, A is independently a fluorine atom, a hydrogen atom, or a monovalent fluorine-containing group whose terminal is a —$CF_3$ group, a —$CF_2H$ group or a —$CH_2F$ group, Z and Z' are independently a single bond, or a 2- to 8-valent organic group which may contain a nitrogen atom, an oxygen atom, a silicon atom, a phosphorus atom or a sulfur atom and may be substituted with fluorine, and W is independently a monovalent organic group having a hydrolyzable group at the terminal, α and β are each independently an integer of 1 to 7 and α+β is an integer of 2 to 8, and γ is an integer of 2 to 8,

A-Rf-Q-(Y)$_\delta$—B     (4)

Rf-(Q-(Y)$_\delta$—B)$_2$     (5)

wherein Rf and A are the same as described above, Q is independently a single bond or a divalent organic group, δs are each independently an integer of 1 to 10, Y is independently a divalent organic group having a hydrolyzable group, and B is independently a hydrogen atom, an alkyl group having 1 to 4 carbon atoms, or a halogen atom.

[7]
The water/oil-repellent member according to [6], wherein the fluorine-containing hydrolyzable organosilicon compounds having the formulas (1) to (5) are those shown below:

[Chem. 3]

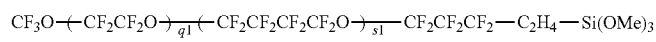

$CF_3O$—$(CF_2CF_2O)_{q1}$—$(CF_2CF_2CF_2CF_2O)_{s1}$—$CF_2CF_2CF_2$—$C_2H_4$—$Si(OMe)_3$

-continued
[Chem. 4]
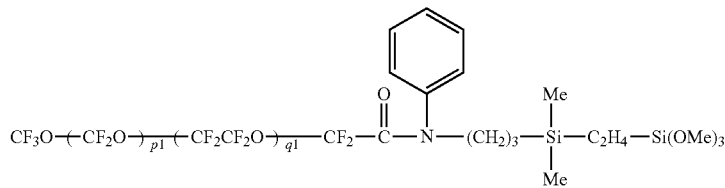
[Chem. 5]
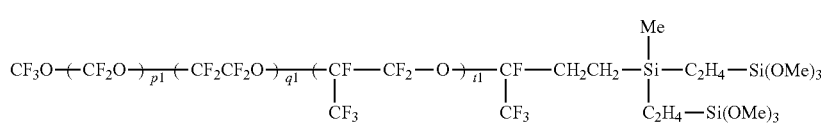
[Chem. 6]
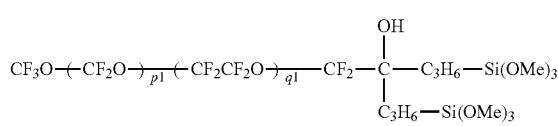
[Chem. 7]
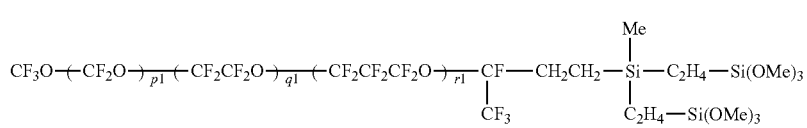
[Chem. 8]
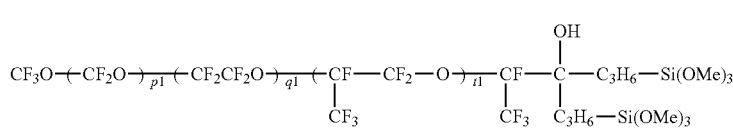
[Chem. 9]
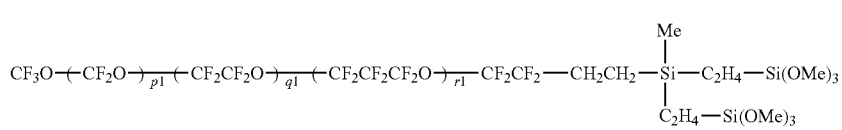
[Chem. 10]
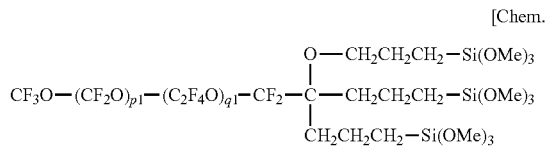
[Chem. 11]
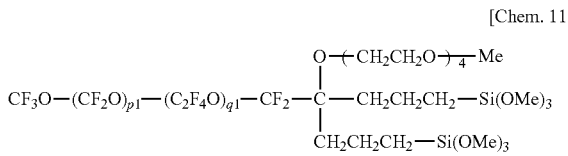
[Chem. 12]
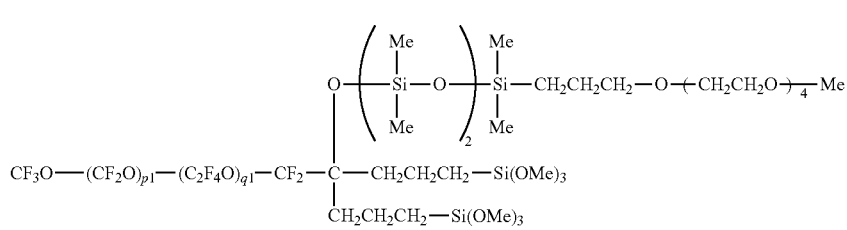
[Chem. 13]
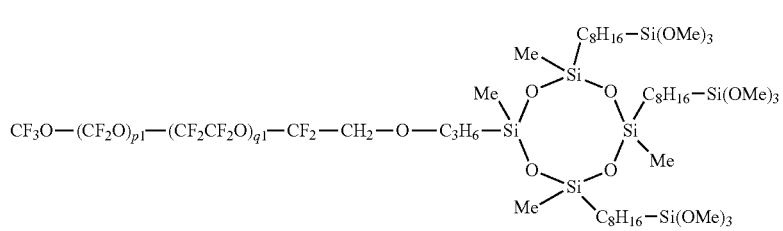
[Chem. 14]
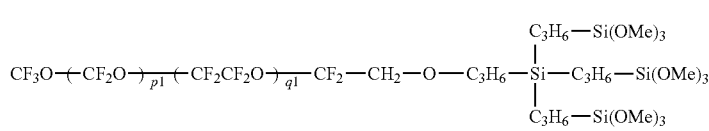

-continued
[Chem. 15]
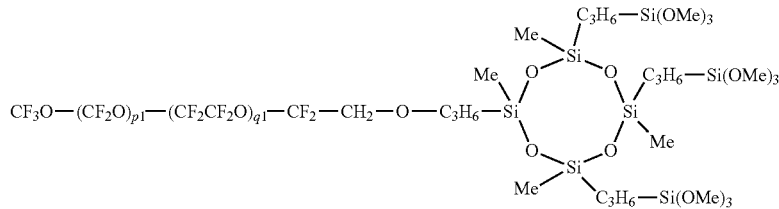
[Chem. 16]
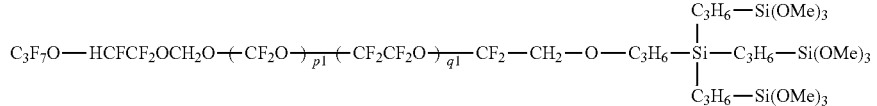
[Chem. 17]
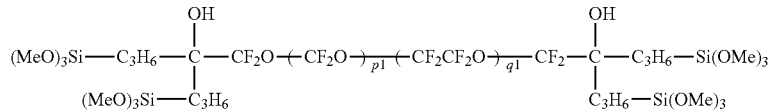
[Chem. 18]
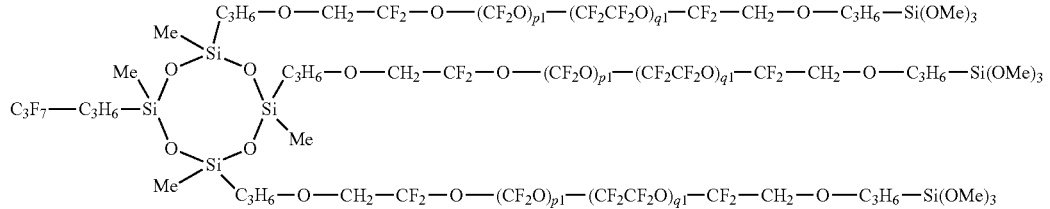
[Chem. 19]
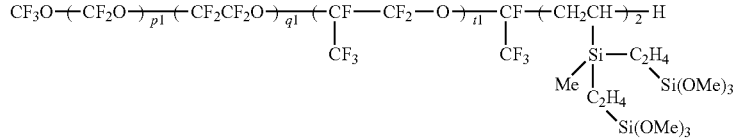
[Chem. 20]
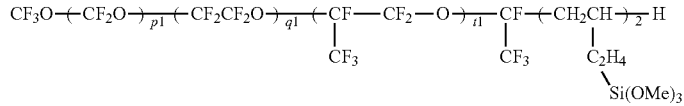
[Chem. 21]
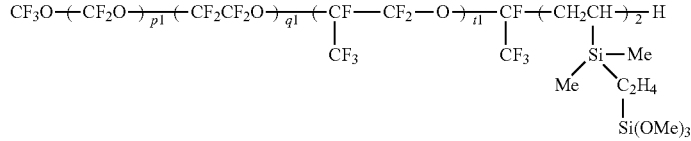
[Chem. 22]
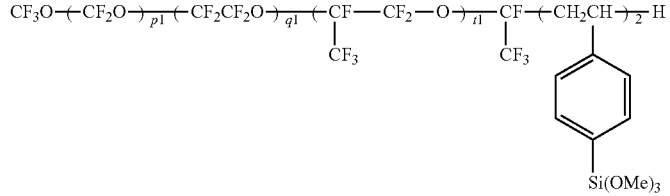
[Chem. 23]
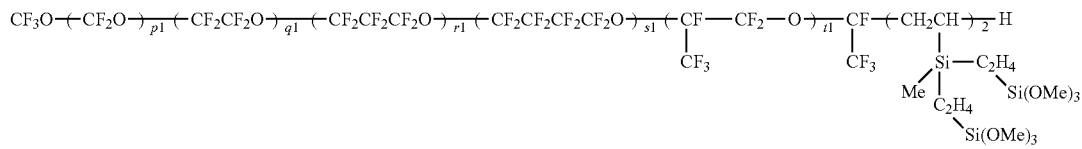

-continued

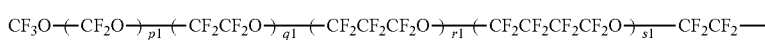
[Chem. 24]

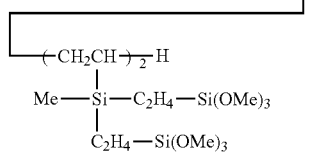

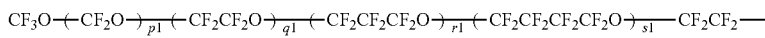
[Chem. 25]

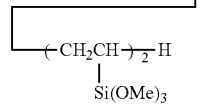

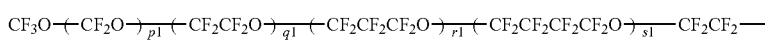
[Chem. 26]

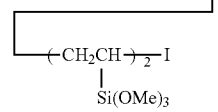

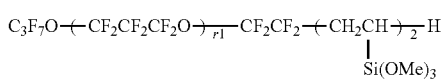
[Chem. 27]

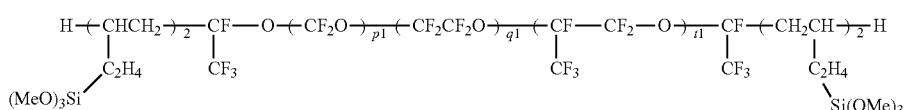
[Chem. 28]

wherein Me is a methyl group, p1, q1, r1, s1, and t1 are each independently an integer of 1 to 200, the sum of p1, q1, r1, s1, and t1 is 3 to 500, and each of repeating units shown in parentheses appended with p1, q1, r1, s1, and t1 may be randomly arranged.

[8]

The water/oil-repellent member according to any one of [1] to [7], wherein the substrate is metal oxide, metal, resin, ceramic, quartz, glass, sapphire, or diamond.

[9]

A method for producing the water/oil-repellent member according to any one of [1] to [8], including steps of wet-coating a solution containing an organosilicon compound having a plurality of silanol groups in a molecule, nanodiamond and a solvent on at least one surface of a substrate; drying the solvent to form and laminate a primer layer on at least one surface of the substrate; wet-coating a solution containing a hydrolyzable fluorine-containing compound and a solvent on an outer surface of the primer layer, and then drying the solvent, or dry-coating a hydrolyzable fluorine-containing compound obtained by evaporating the solvent from the solution; and curing the hydrolyzable fluorine-containing compound to form and laminate a water/oil-repellent layer on the outer surface of the primer layer.

In the present invention, the "linear perfluorooxyalkylene polymer residue" means that the divalent fluorooxyalkylene repeating units constituting the perfluorooxyalkylene structure of a main chain are linearly linked, and each divalent fluorooxyalkylene unit itself may be, for example, a fluorooxyalkylene unit having a branched structure such as —[$CF_2CF(CF_3)O$]—.

Advantageous Effects of Invention

According to the present invention, it is possible to form a water/oil-repellent member in which a surface of an anti-fouling layer having excellent water/oil-repellent property is firmly adhered, and further, the water/oil-repellent member has excellent abrasion resistance by containing nanodiamond. The method for producing the water/oil-repellent member can form by a wet (brush coating, spin coating, spray coating, gravure coating, die coating, bar coating, slit coating) process without requiring a vacuum process or a high-temperature heating process, and can be applied to various applications. For example, it is useful for articles having an anti-fouling property on the surface, in particular, housings of electronic devices, wearable terminals, kitchen equipment and sanitary articles, bodies of transportation equipment, touch panel displays, protective films, and the like.

DESCRIPTION OF EMBODIMENTS

Hereinafter, the invention is described in more detail.

The present invention provides a water/oil-repellent member having a primer layer (first layer) having a film thickness of 0.5 to 500 nm which contains an organosilicon compound having a plurality of silanol groups in a molecule as a principal component and contains nanodiamond on at least one surface of various substrates, and further having a water/oil-repellent layer (second layer) having a film thickness of 0.5 to 30 nm which contains a cured product of a hydrolyzable fluorine-containing compound as a principal component on its outer surface, by a method of wet-coating a solution (composition) containing an organosilicon compound having a plurality of silanol groups in a molecule, nanodiamond and a solvent on at least one surface (at least one surface) of various substrates as a first layer, then drying the solvent to form and laminate a primer layer on at least one surface of the substrates, further, wet-coating a solution containing a hydrolyzable fluorine-containing compound and a solvent (water/oil-repellent agent) on an outer surface of the primer layer as a second layer, and then drying the solvent, or dry-coating a hydrolyzable fluorine-containing compound obtained by evaporating the solvent from the solution, and curing the hydrolyzable fluorine-containing compound to form and laminate a water/oil-repellent layer on the outer surface of the primer layer, or the like.

The substrate to be applied in the present invention is not particularly limited, but metal oxide, metal, resin, ceramic, quartz, glass, sapphire, or diamond is particularly suitable.

Here, examples of the metal oxide of the substrate include SiO, $SiO_2$, $Al_2O_3$, ITO, $In_2O_3$, $SnO_2$, $ZrO_2$, $TiO_2$, $Ti_2O_3$, $Ti_4O_7$, $Ti_3O_5$, $Nb_2O_5$, $Ta_2O_5$, $Y_2O_3$, $WO_3$, $HfO_2$, $La_2Ti_2O_7$, and the like.

Also, examples of the metal of the substrate include magnesium, magnesium alloy, titanium, titanium alloys, chromium, iron, nickel, cobalt, copper, zinc, yttrium, zirconium, niobium, molybdenum, ruthenium, rhodium, palladium, silver, tungsten, platinum, gold, stainless steel, aluminum, aluminum alloys, duralumin, hastelloy, and the like.

Furthermore, examples of the resin of the substrate include thermoplastic resins or thermosetting resins, and specifically, the following resins are preferred. Examples include aliphatic polyamides such as celluloid, cellulose acetate, cellulose propionate, cellulose butyrate, 6-nylon, 6,6-nylon, and 12 nylon, aromatic polyamide, ABS, AS resin, polystyrene, polyethylene (low density or high density), polyolefins such as polypropylene, polyvinyl chloride, polyvinylidene chloride, ethylene-vinyl acetate copolymer, polyvinyl alcohol, polyacetal, polycarbonate, saturated polyesters such as polyethylene terephthalate and polybutylene terephthalate, aromatic polyester, polyether ketone, polyetheretherketone, polysulfone, polyether sulfone, polyetherimide, polyarylate, polymethylpentene, ionomer, liquid crystal polymer, polyimide, polyamideimide, fluororesin, polyphenylene sulfide, (modified) polyphenylene oxide, thermoplastic resins such as thermoplastic polyurethane, or thermosetting resins such as epoxy resin, unsaturated polyester, thermosetting polyurethane, polyimide, a polymer of diethylene glycol bisallyl carbonate (commonly called CR-39), a (co)polymer of di(meth)acrylate of (halogenated) bisphenol A, a (co)polymer of urethane-modified di(meth)acrylate of (halogenated) bisphenol A, a diacrylate compound, and a copolymer of vinylbenzyl alcohol and an unsaturated thiol compound.

Moreover, examples of the ceramic include alumina, zirconia, silicon nitride, silicon carbide, aluminum nitride, boron nitride, forsterite, steatite, cordierite, sialon, machinable ceramics, barium titanate, lead zirconate titanate, ferrite, mullite, zircon, and the like, and examples of the glass include soda glass, crown glass, lead glass, borosilicate glass, crystallized glass, quartz glass, aluminosilicate glass, Tempax, Pyrex, neoceram, and the like, but are not limited thereto. The glass may be subjected to chemical strengthening treatment or physical strengthening treatment.

The primer layer (first layer) formed and laminated on at least one surface of the substrate has a film thickness of 0.5 to 500 nm which contains an organosilicon compound having a plurality of silanol groups in a molecule as a principal component, contains nanodiamond, and preferably contains 50 wt % or more (more preferably 51 to 99.9 wt %, further preferably 80 to 99.9 wt %, especially preferably 85 to 99.5 wt %, most preferably 90 to 99.1 wt %) of the organosilicon compound. The primer layer can be formed (laminated) by, for example, wet-coating a solution (composition) containing an organosilicon compound having a plurality of silanol groups in a molecule, nanodiamond and a solvent to the surface of various substrates, and then drying and removing the solvent. The phrase "containing an organosilicon compound as a principal component" above means that the content of the organosilicon compound is the largest among components contained in the primer layer.

The organosilicon compound having a plurality of silanol groups in a molecule preferably has two or more, more preferably three or more, and further preferably four or more silanol groups in one molecule. If the amount of the silanol group is too small, physical strength and adhesion of the film itself may be weakened. Note that, it is preferred that the amount of silanol groups in the organosilicon compound having a plurality of silanol groups in a molecule is 0.0001 to 0.05 mol/g, particularly 0.001 to 0.04 mol/g, and especially 0.005 to 0.03 mol/g.

The organosilicon compound having a plurality of silanol groups in a molecule can be obtained by hydrolyzing and partially condensing an organosilicon compound having a plurality of hydrolyzable groups such as alkoxy groups such as a methoxy group and an ethoxy group, and halogen atoms such as a chlorine atom in a molecule.

Here, examples of the organosilicon compound having a plurality of hydrolyzable groups in a molecule include methyltrimethoxysilane, dimethyldimethoxysilane, phenyltrimethoxysilane, dimethoxydiphenylsilane, tetramethoxysilane, tetraethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, decyltrimethoxysilane, 1,6-bis(trimethoxysilyl)hexane, trifluoropropyltrimethoxysilane, vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, tris-(trimethoxysilylpropyl)isocyanurate, trichlorosilane, dichlorosilane, and the like, and two or more thereof may be used in mixture.

In the present invention, as the organosilicon compound having a plurality of silanol groups in a molecule, it is preferable to use an organosilicon compound such as the organosilane having a plurality of hydrolyzable groups in a molecule described above, which is hydrolyzed and then partially dehydrated and condensed to have a high molecular weight (partial condensate). In the present invention, the partial condensate means an organopolysiloxane compound having a plurality of remaining silanol groups in a molecule, obtained by partially dehydrating and condensing an organosilane having a plurality of silanol groups (hydroxyl groups bonded to a silicon atom) in a molecule obtained by hydrolyzing the organosilicon compound such as an organosilane having a plurality of hydrolyzable groups in the molecule.

The hydrolyzed partial condensate of the organosilicon compound having a plurality of hydrolyzable groups in a molecule (organosilicon compound having a plurality of silanol groups in a molecule) has a weight average molecular weight of preferably 300 to 100,000, and further preferably 5,000 to 50,000. In the present invention, the weight average molecular weight can be determined as, for example, the polystyrene-equivalent value in gel permeation chromatography (GPC) analysis using toluene as a developing solvent (the same applies hereinafter).

As the organosilicon compound having a plurality of silanol groups in a molecule used in the present invention, one or more (co)hydrolyzed partial condensates of (organo)alkoxysilanes such as tetraalkoxysilanes such as tetramethoxysilane and tetraethoxysilane, and alkyltrialkoxysilanes such as methyltrimethoxysilane, methyltriethoxysilane, ethyltrimethoxysilane, and ethyltriethoxysilane are preferred, and hydrolyzed partial condensates of tetraalkoxysilane are particularly preferred.

The organosilicon compound having a plurality of silanol groups in a molecule is desirably diluted with a solvent. As the solvent for dissolving the organosilicon compound having a plurality of silanol groups in a molecule, alcohols such as methanol, ethanol, isopropanol, and butanol, and ethers such as propylene glycol monomethyl ether and polyethylene glycol monopropyl ether are preferred, but the solvent is not particularly limited, and may be appropriately selected in terms of wettability with the substrate and boiling point.

The concentration of the organosilicon compound having a plurality of silanol groups in a molecule in a solution containing the organosilicon compound having a plurality of silanol groups in a molecule and a solvent is preferably 0.01 to 10 wt %, and further preferably 0.1 to 4 wt %. If the concentration is too low, uncoated portions increase, and if the concentration is too high, secondary aggregation may occur between silanol groups.

The nanodiamond to be mixed with the organosilicon compound having a plurality of silanol groups in a molecule is produced by a blasting method or the like, but commercially available nanodiamond can be used, and the primary particle diameter is preferably 1 to 30 nm, and more preferably 3 to 10 nm. If the primary particle size is less than 1 nm, sufficient abrasion resistance may not be exhibited, and if the primary particle size exceeds 30 nm, it may be difficult to uniformly distribute the nanodiamond. The primary particle size of the nanodiamond can be measured by a dynamic laser scattering method, a transmission electron microscope, a scanning electron microscope, or the like.

In addition, the nanodiamond may have a functional group such as a carboxyl group, a hydroxyl group, or a hydrogen group on the surface.

Mixing of 0.1 to 20 wt % of the nanodiamond is preferred, mixing of 0.5 to 15 wt % is more preferred, and mixing of 0.9 to 10 wt % is further preferred, with respect to the organosilicon compound having a plurality of silanol groups in a molecule. If the content of the nanodiamond is too small, sufficient abrasion resistance may not be exhibited, and if the content is too large, the primer layer may become black and appearance may be deteriorated.

The solution (composition) containing an organosilicon compound having a plurality of silanol groups in a molecule, nanodiamond and a solvent can be prepared by uniformly mixing these. In the present invention, it is preferable to add nanodiamond to a solution obtained by mixing an organosilicon compound having a plurality of silanol groups in a molecule and a solvent.

In addition, components such as surfactants such as an ultraviolet absorber, a light stabilizer, an antioxidant, a leveling agent, an antifoaming agent, a pigment, a dye, a dispersant, an antistatic agent, and an antifogging agent may be blended in the solution (composition) containing an organosilicon compound having a plurality of silanol groups in a molecule, nanodiamond and a solvent, as necessary.

It is to be noted that these are preferably added in a range in which the total of the organosilicon compound having a plurality of silanol groups in a molecule and the nanodiamond in the primer layer obtained by removing the solvent is 50 wt % or more (50 to 100 wt %), and particularly 80 to 100 wt % (that is, the content of the optional component is 50 wt % or less (0 to 50 wt %), preferably 0 to 20 wt %).

The solution (composition) containing an organosilicon compound having a plurality of silanol groups in a molecule, nanodiamond and a solvent is applied to the surface of the substrate by a method such as wet coating, particularly dipping, brush coating, spin coating, spray coating, gravure coating, die coating, bar coating, slit coating, or flow coating, and the solvent is dried, whereby a primer layer containing an organosilicon compound having a plurality of silanol groups in a molecule as a principal component and containing nanodiamond can be formed. The solvent can be dried at 25 to 150° C. for about 1 minute to 1 hour. Note that, heating may be performed at, for example, 40 to 500° C. for 1 minute to 24 hours in a temperature range that does not affect the substrate.

The film thickness of the primer layer (first layer) formed and laminated on at least one surface of the substrate is appropriately selected depending on the type of the substrate, and is usually 0.5 to 500 nm, preferably 1 to 200 nm, more preferably 5 to 100 nm, and further preferably 10 to 50 nm. In the present invention, the film thickness can be measured by a known method such as spectroscopic ellipsometry, an X-ray reflectance method, a fluorescent X-ray film thickness measurement method, or SEM (the same applies hereinafter).

Next, the water/oil-repellent layer (second layer) formed and laminated on an outer surface of the primer layer is composed of a layer having a film thickness of 0.5 to 30 nm which contains a cured product of a hydrolyzable fluorine-containing compound as a principal component. The water/oil-repellent layer can be formed and laminated, for example, by applying a solution containing a hydrolyzable fluorine-containing compound and a solvent (water/oil-repellent agent) on the outer surface of the formed primer layer (first layer) and curing the solution.

As the hydrolyzable fluorine-containing compound, hydrolyzable fluorine-containing organosilicon compounds described in JP-A 2007-197425, JP-A 2007-297589, JP-A 2007-297543, JP-A 2008-088412, JP-A 2008-144144, JP-A 2010-031184, JP-A 2010-047516, JP-A 2011-116947, JP-A 2011-178835, JP-A 2014-084405, JP-A 2014-105235, JP-A 2013-253228, JP-A 2014-218639, WO 2013/121984 (Patent Documents 1, 4 to 16) and the like can be used.

The hydrolyzable fluorine-containing compound is described more specifically.

The hydrolyzable fluorine-containing compound according to the present invention is preferably a hydrolyzable fluorine-containing compound each having at least 1, preferably 1 to 6, and more preferably 2 to 4 hydrolyzable silyl groups (for example, having at least 1, preferably 2 to 60, and more preferably 3 to 30 hydrolyzable silyl groups in one molecule) at at least 1, preferably 1 to 14, and more preferably 1 to 7 molecular chain terminals, and the compound is more preferably an organosilicon compound having a hydrolyzable silyl group selected from alkoxy groups having 1 to 12 carbon atoms, particularly 1 to 10 carbon atoms, such as a methoxy group, an ethoxy group, a propoxy group, and a butoxy group, alkoxyalkoxy groups having 2 to 12 carbon atoms, particularly 2 to 10 carbon atoms, such as a methoxymethoxy group and a methoxyethoxy group, acyloxy groups having 1 to 10 carbon atoms, such as an acetoxy group, alkenyloxy groups having 2 to 10 carbon atoms, such as an isopropenoxy group, silyl groups having a halogen group such as a chloro group, a bromo group or an iodo group or an amino group, a silazane group and the like, in one molecule, and having a fluorine atom.

The hydrolyzable fluorine-containing compound is preferably a compound having a fluorooxyalkylene group. The fluorooxyalkylene group has a (poly)fluorooxyalkylene structure to which a plurality of one or more kinds of repeating units of —$C_jF_{2j}O$— are arranged (in the structure, j is an integer of 1 or more, preferably 1 to 6, and more preferably 1 to 4). In particular, it is preferable to have 3 to 500, preferably 15 to 200, further preferably 20 to 100, and more preferably 25 to 80 repeating units.

The repeating unit —$C_jF_{2j}O$— may be either a linear type or a branched type. Examples thereof include the following units, and the repeating unit may be one in which two or more of these repeating units are arranged.

—$CF_2O$—

—$CF_2CF_2O$—

—$CF_2CF_2CF_2O$—

—$CF(CF_3)CF_2O$—

—$CF_2CF_2CF_2CF_2O$—

—$CF_2CF_2CF_2CF_2CF_2O$—

—$C(CF_3)_2O$—

The (poly)fluorooxyalkylene structure (divalent linear perfluorooxyalkylene polymer residue) is particularly —$(CF_2)_{d'}$—O—$(CF_2O)_p(CF_2CF_2O)_q(CF_2CF_2CF_2O)_r(CF_2CF_2CF_2CF_2O)_s(CF(CF_3)CF_2O)_t$—$(CF_2)_{d'}$—, in which p, q, r, s, and t are each independently an integer of 0 to 200, preferably p is an integer of 5 to 100, q is an integer of 5 to 100, r is an integer of 0 to 100, s is an integer of 0 to 50, t is an integer of 0 to 100, and p+q+r+s+t is an integer of 3 to 500, preferably an integer of 10 to 105. Note that, each of repeating units shown in parentheses appended with p, q, r, s, and t may be randomly arranged. d is independently an integer of 0 to 8, preferably an integer of 0 to 5, and further preferably an integer of 0 to 2, and the unit may be linear or branched. In particular, it can be represented by the following structure.

wherein p', q', r', s', and t' are each independently an integer of 1 to 200, and the sum of p', q', r', s', and t' is 3 to 500, each of repeating units shown in parentheses appended with p', q', r', s', and t' may be randomly arranged, d' is independently an integer of 0 to 5, and the unit may be linear or branched.

The hydrolyzable fluorine-containing compound according to the present invention is more preferably a fluorine-containing hydrolyzable organosilicon compound having any of the following general formulas (1) to (5) (fluorooxyalkylene group-containing hydrolyzable organosilicon compound). These may be used singly or in combination of two or more thereof.

$(A-Rf)_\alpha ZW_\beta$         (1)

$Rf$—$(ZW_\beta)_2$         (2)

$Z'$—$(Rf$—$ZW_\beta)_\gamma$         (3)

$A$-$Rf$-$Q$-$(Y)_\delta$—$B$         (4)

$Rf$-$(Q$-$(Y)_\delta$—$B)_2$         (5)

In the formulas (1) to (5), Rf is independently a divalent linear perfluorooxyalkylene polymer residue of —$(CF_2)_d$—O—$(CF_2O)_p(CF_2CF_2O)_q(CF_2CF_2CF_2O)_r(CF_2CF_2CF_2CF_2O)_s(CF(CF_3)CF_2O)_t$—$(CF_2)_d$—, p, q, r, s, and t are each independently an integer of 0 to 200, p+q+r+s+t is 3 to 500, each of repeating units shown in parentheses appended with p, q, r, s, and t may be randomly arranged, d is independently an integer of 0 to 8, and the unit may be linear or branched, A is independently a fluorine atom, a hydrogen atom, or a monovalent fluorine-containing group whose terminal is a —$CF_3$ group, a —$CF_2H$ group or a —$CH_2F$ group, Z and Z' are independently a single bond, or a 2- to 8-valent organic group which may contain a nitrogen atom, an oxygen atom, a silicon atom, a phosphorus atom or a sulfur atom and may be substituted with fluorine, and W is independently a monovalent organic group having a hydrolyzable group at the terminal, α and β are each independently an integer of 1 to 7, preferably a is an integer of 1 to 3, more preferably 1, R is an integer of 1 to 3, and α+β is an integer of 2 to 8, preferably an integer of 2 to 4. γ is an integer of 2 to 8, preferably 2 or 3.

In addition, Q is independently a single bond or a divalent organic group, δs are each independently an integer of 1 to 10, Y is independently a divalent organic group having a

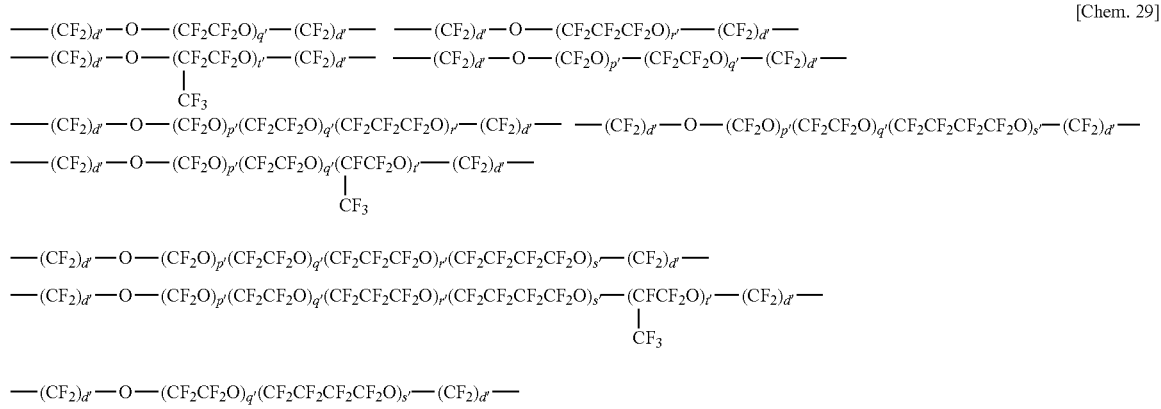

[Chem. 29]

hydrolyzable group, and B is independently a hydrogen atom, an alkyl group having 1 to 4 carbon atoms, or a halogen atom.

In the above formulas (1) to (5), Rf is —$(CF_2)_d$—O—$(CF_2O)_p(CF_2CF_2O)_q(CF_2CF_2CF_2O)_r(CF_2CF_2CF_2CF_2O)_s$ $(CF(CF_3)CF_2O)_t$—$(CF_2)_{d'}$—, which is the (poly)fluorooxyalkylene structure (divalent linear perfluorooxyalkylene polymer residue) described above, and examples thereof may include the same as described above.

In the above formulas (1) and (4), A is independently a fluorine atom, a hydrogen atom, or a monovalent fluorine-containing group whose terminal is a —$CF_3$ group, a —$CF_2H$ group, or a —$CH_2F$ group. Specific examples of the monovalent fluorine-containing group whose terminal is a —$CF_3$ group, a —$CF_2H$ group or a —$CH_2F$ group may include a —$CF_3$ group, a —$CF_2CF_3$ group, a —$CF_2CF_2CF_3$ group, a —$CH_2CF(CF_3)$—$OC_3F_7$ group, a —$CH_2OCF_2CFH$—$OC_3F_7$ group, and the like. As A, among them, a —$CF_3$ group, a —$CF_2CF_3$ group, a —$CF_2CF_2CF_3$ group, and a —$CH_2OCF_2CFH$—$OC_3F_7$ group are preferred.

In the above formulas (1) to (3), Z and Z' are independently a single bond, or a 2- to 8-valent organic group which may contain a nitrogen atom, an oxygen atom, a silicon atom, a phosphorus atom or a sulfur atom and may be substituted with fluorine. The organic group can be of $(L)_e$-M (e is an integer of 1 to 7, preferably an integer of 1 to 3).

Here, L is a single bond, or an oxygen atom, a sulfur atom, or a divalent organic group, and in the above formulas (1) to (3), L of Z is a linking group between an Rf group and M (or a W group), and L of Z' is a linking group between M (or an Rf group) and an Rf group. The divalent organic group is preferably an unsubstituted or substituted divalent organic group having 2 to 12 carbon atoms which may contain one or more selected from the group consisting of diorganosilylene groups such as an amide bond, an ether bond, a carbonyl bond, an ester bond, or a dimethylsilylene group, and groups of —$Si[OH][(CH_2)_fSi(CH_3)_3]$— (f is an integer of 2 to 4), and more preferably an unsubstituted or substituted divalent hydrocarbon group having 2 to 12 carbon atoms which may contain the above structure.

Examples of the unsubstituted or substituted divalent hydrocarbon group having 2 to 12 carbon atoms include alkylene groups such as an ethylene group, a propylene group (a trimethylene group, a methylethylene group), a butylene group (a tetramethylene group, a methylpropylene group), a hexamethylene group, and an octamethylene group, arylene groups such as a phenylene group, or combinations of two or more of these groups (such as an alkylene arylene group). Furthermore, these groups may be groups in which a part or all of hydrogen atoms bonded to carbon atoms of these groups are substituted with halogen atoms such as fluorine and iodine. Among them, an unsubstituted or substituted alkylene group or phenylene group having 2 to 4 carbon atoms is preferred.

Examples of the divalent organic group of L include groups having the following structure or groups in which two or more thereof are bonded.

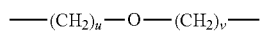

[Chem. 30]

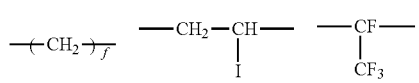

[Chem. 31]

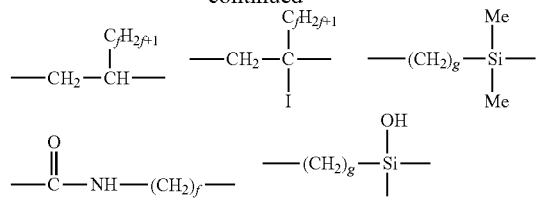

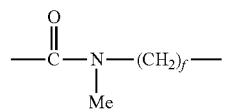

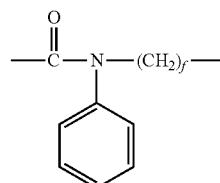

[Chem. 32]

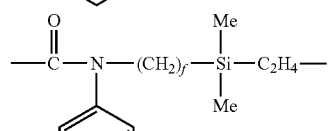

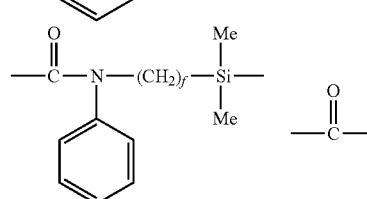

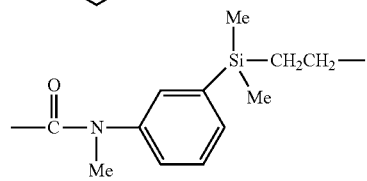

[Chem. 33]

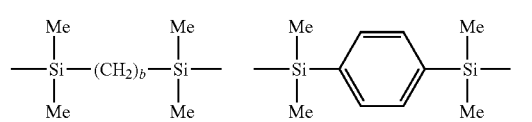

wherein f is an integer of 2 to 4, b is an integer of 2 to 6, preferably an integer of 2 to 4, u and v are integers of 1 to 4, g is an integer of 2 to 4, and Me is a methyl group.

M is a single bond, a nitrogen atom, a silicon atom, a carbon atom, a phosphorus atom, or a group containing these, or a 2- to 8-valent, preferably 2- to 4-valent ((e+1)-valent above) organic group. Specifically, M is a single bond, a group selected from a divalent group of —$R^1{}_2C$—, a divalent group of —$R^{32}Si$—, a divalent group of —$NR^4$—, a trivalent group of —N=, a trivalent group of —P=, a trivalent group of —PO=, a trivalent group of —$R^1C$=, a trivalent group of —$R^3Si$=, a tetravalent group of —C≡, a tetravalent group of —O—C≡, and a tetravalent group of —Si≡, or a 2- to 8-valent, preferably 2- to 4-valent siloxane residue, and in the above formulas (1) to (3), M of Z is a linking group between L (or an Rf group) and a W group, and, M of Z' is a group linking an Rf group and an Rf group via L (or Rf groups).

In the above, R¹s are mutually independently preferably an alkyl group having 1 to 3 carbon atoms, a hydroxyl group, a group having a repeating unit of an oxyalkylene group having 1 to 3 carbon atoms which may have a diorganosiloxane structure having 2 to 51 silicon atoms interposed therebetween, or a silyl ether group of R²₃SiO—, and R²s are mutually independently a hydrogen atom, preferably an alkyl group having 1 to 3 carbon atoms, an aryl group having 6 to 10 carbon atoms such as a phenyl group, or an alkoxy group having 1 to 3 carbon atoms. R³s are mutually independently preferably an alkyl group having 1 to 3 carbon atoms, an alkenyl group having 2 or 3 carbon atoms, an alkoxy group having 1 to 3 carbon atoms, or a chloro group. R⁴ is an alkyl group of 1 to 3 carbon atoms or an aryl group of 6 to 10 carbon atoms such as a phenyl group. When M is a siloxane residue, it is preferable to have a linear, branched or cyclic organopolysiloxane structure having 2 to 51 silicon atoms, preferably 2 to 13 silicon atoms, more preferably 2 to 11 silicon atoms, and further preferably 2 to 5 silicon atoms. The organopolysiloxane preferably has an unsubstituted or fluorine-substituted alkyl group having 1 to 8 carbon atoms, more preferably 1 to 4 carbon atoms such as a methyl group, an ethyl group, a propyl group or a butyl group, $C_3F_7$—$C_3H_6$—, and the like, or a phenyl group. It may also contain a silalkylene structure in which two silicon atoms are bonded by an alkylene group, that is, Si—$(CH_2)_n$—Si. In the above formula, n is an integer of 2 to 6, preferably an integer of 2 to 4.

Examples of such M include those shown below.

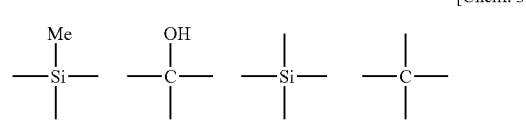

[Chem. 34]

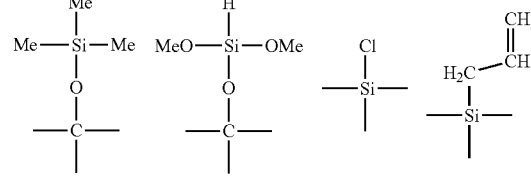

[Chem. 35]

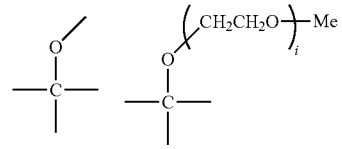

[Chem. 36]

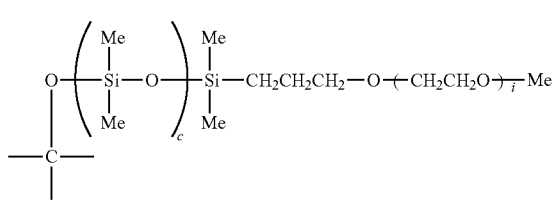

[Chem. 37]

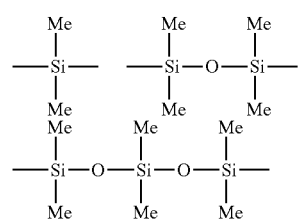

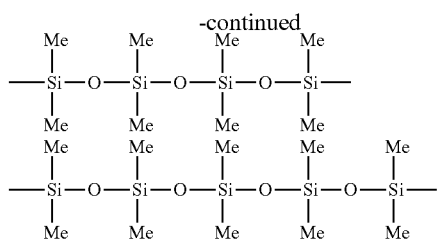

[Chem. 38]

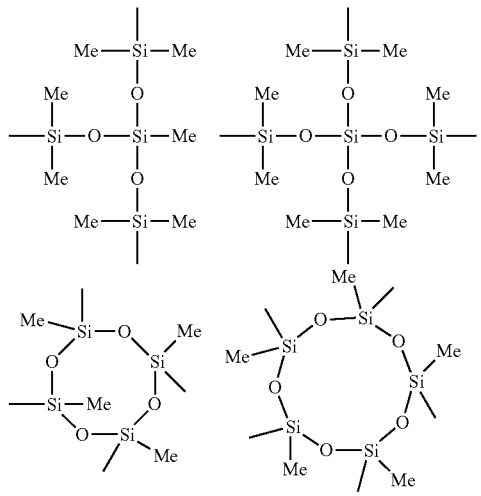

[Chem. 39]

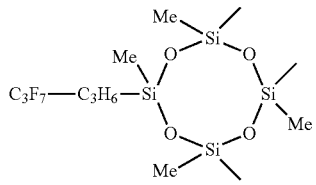

[Chem. 40]

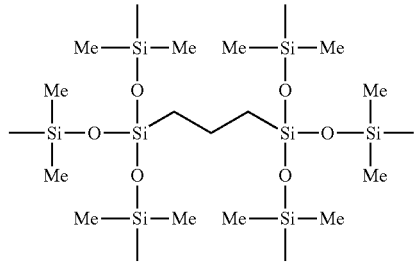

wherein i is an integer of 1 to 20, c is an integer of 1 to 50, and Me is a methyl group.

In the above formulas (1) to (3), W is independently a monovalent organic group having a hydrolyzable group at the terminal, and is preferably having the following formula:

[Chem. 41]

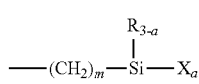

wherein R is an alkyl group having 1 to 4 carbon atoms or a phenyl group, X is independently a hydrolyzable group, a is 2 or 3, and m is an integer of 0 to 10.

Examples of the hydrolyzable group of X in the above formula include alkoxy groups having 1 to 12 carbon atoms, particularly 1 to 10 carbon atoms, such as a methoxy group, an ethoxy group, a propoxy group, and a butoxy group; alkoxyalkoxy groups having 2 to 12 carbon atoms, particularly 2 to 10 carbon atoms, such as a methoxymethoxy group and a methoxyethoxy group; acyloxy groups having 1 to 10 carbon atoms, such as an acetoxy group; alkenyloxy groups having 2 to 10 carbon atoms, such as an isopropenoxy group; halogen groups such as a chloro group, a bromo group, and an iodo group; amino groups; and the like. Among them, a methoxy group and an ethoxy group are preferred.

Also, R is an alkyl group having 1 to 4 carbon atoms such as a methyl group or an ethyl group, or a phenyl group, and among them, a methyl group is preferred.

a is 2 or 3, and is preferably 3 from the viewpoint of reactivity and adhesion to the substrate. m is an integer of 0 to 10, preferably an integer of 2 to 8, and more preferably an integer of 2 or 3.

In the formulas (1) to (3), examples of the structures of $(-)_\alpha ZW_\beta$ and $—ZW_\beta$ include the following structures:

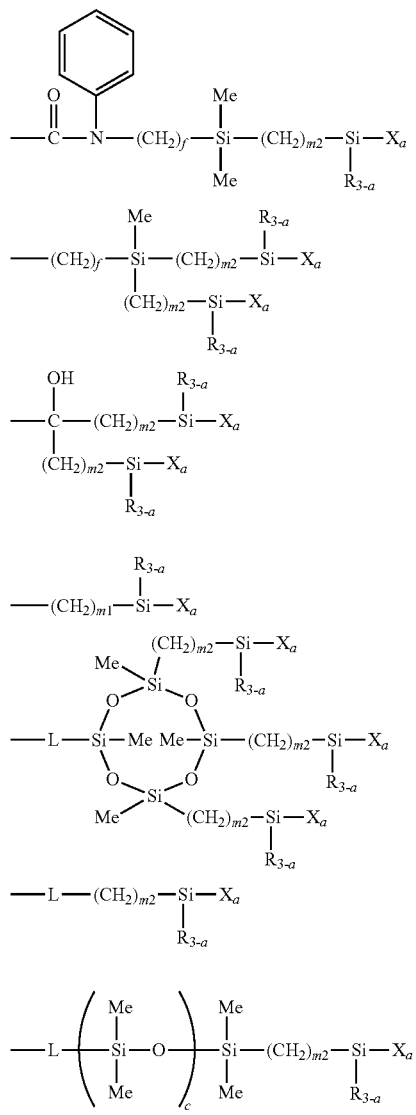

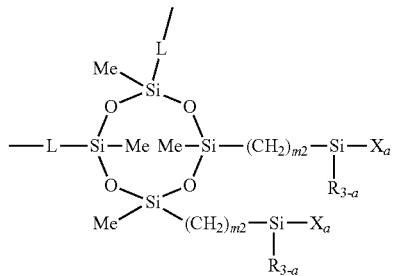

wherein L, R, X, f, c, and a are as described above, m1 is an integer of 0 to 10, preferably an integer of 2 to 8, m2 is an integer of 1 to 10, preferably an integer of 2 to 8, and Me is a methyl group.

In the above formulas (4) and (5), Q is independently a single bond or a divalent organic group, and is a linking group between an Rf group and a Y group. The divalent organic group of Q is preferably an unsubstituted or substituted divalent organic group having 2 to 12 carbon atoms which may contain one or more selected from the group consisting of diorganosilylene groups such as an amide bond, an ether bond, an ester bond, or a dimethylsilylene group, and groups of —Si[OH][(CH2)fSi(CH3)3]- (f is an integer of 2 to 4), and more preferably an unsubstituted or substituted divalent hydrocarbon group having 2 to 12 carbon atoms which may contain the above structure.

Examples of the unsubstituted or substituted divalent hydrocarbon group having 2 to 12 carbon atoms can include the same groups as the unsubstituted or substituted divalent hydrocarbon group having 2 to 12 carbon atoms exemplified in the above L.

Examples of the divalent organic group of Q include groups having the following structures:

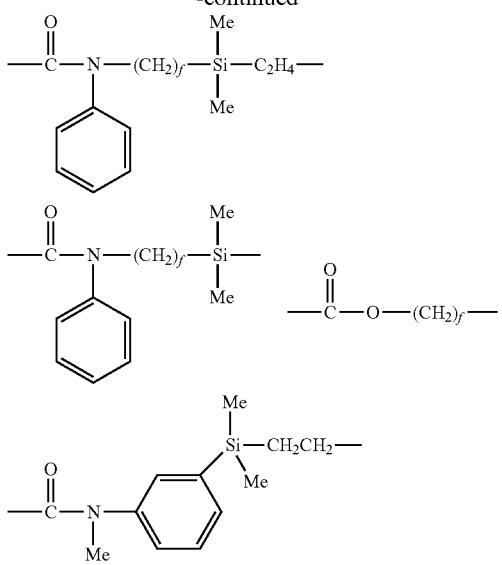

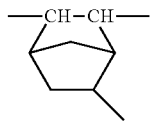

wherein f is an integer of 2 to 4, b is an integer of 2 to 6, preferably an integer of 2 to 4, u and v are integers of 1 to 4, g is an integer of 2 to 4, and Me is a methyl group.

In the above formulas (4) and (5), Ys are mutually independently a divalent organic group having a hydrolyzable group, and preferably have a structure having the following formula:

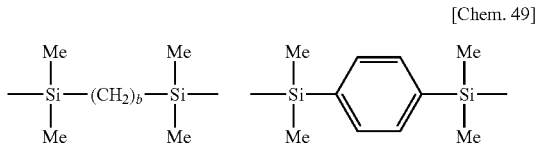

[Chem. 50]

wherein R, X and a are as described above, k is an integer of 0 to 10, preferably an integer of 1 to 10, and more preferably an integer of 2 to 8, h is an integer of 1 to 6, preferably 1 or 2, M' is an unsubstituted or substituted 3- to 8-valent, preferably 3-valent or 4-valent hydrocarbon group, and a part or all of carbon atoms in the hydrocarbon group may be replaced with silicon atoms, and a part or all of hydrogen atoms bonded to the carbon atoms may be replaced with halogen atoms such as fluorine atoms.

M' is preferably a group having the following structures:

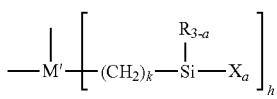

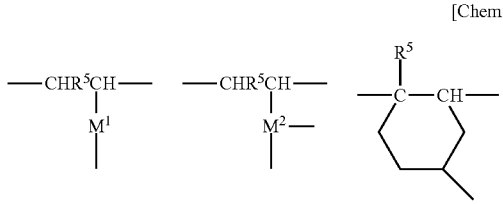

[Chem. 51]

wherein $M^1$ is a single bond, an unsubstituted or substituted divalent hydrocarbon group having 1 to 6 carbon atoms, or a diorganosilylene group such as a dimethylsilylene group, $M^2$ is a trivalent group of $-R^1C=$ or a trivalent group of $-R^3Si=$, and $R^1$ and $R^3$ are the same as described above, and $R^5$ is a hydrogen atom or a monovalent hydrocarbon group such as an alkyl group having 1 to 6 carbon atoms such as a methyl group, an ethyl group, and a propyl group.

Examples of $M^1$ include a single bond, a phenylene group, a dimethylsilylene group, a tetrafluoroethylene group, and the like. In addition, examples of $M^2$ include those shown below:

[Chem. 52]

Me—Si— wherein Me is a methyl group.

Examples of such Y include the following groups:

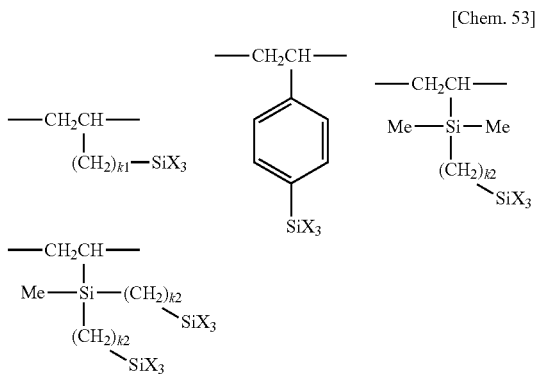

[Chem. 53]

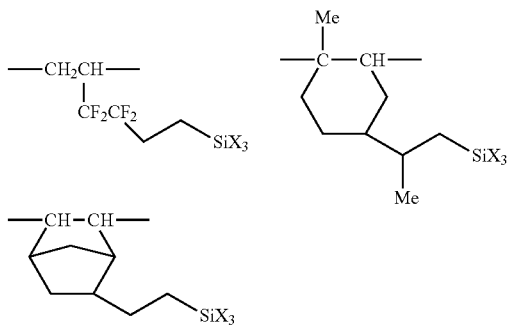

[Chem. 54]

wherein X is the same as described above, k1 is an integer of 0 to 10, preferably an integer of 1 to 8, k2 is an integer of 2 to 10, preferably an integer of 2 to 8, and Me is a methyl group.

In the formulas (4) and (5), δs are each independently an integer of 1 to 10, preferably an integer of 1 to 4.

Also, Bs are mutually independently a hydrogen atom, an alkyl group having 1 to 4 carbon atoms such as a methyl group, an ethyl group, a propyl group or a butyl group, or a halogen atom such as a fluorine atom, a chlorine atom, a bromine atom or an iodine atom.

Examples of the fluorine-containing hydrolyzable organosilicon compound having the above formulas (1) to (5) (fluorooxyalkylene group-containing hydrolyzable organosilicon compound) include the following structures:

[Chem. 55]

[Chem. 56]
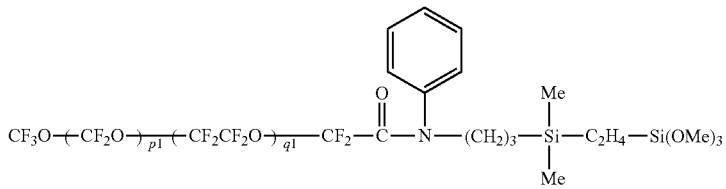

[Chem. 57]
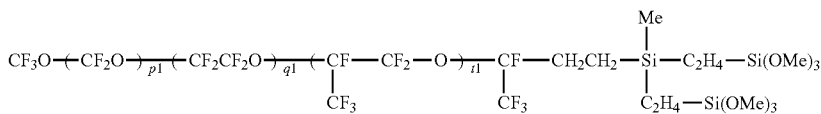

[Chem. 58]
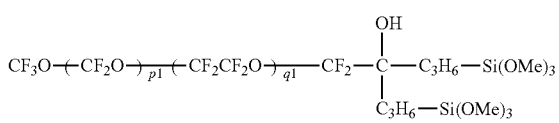

[Chem. 59]
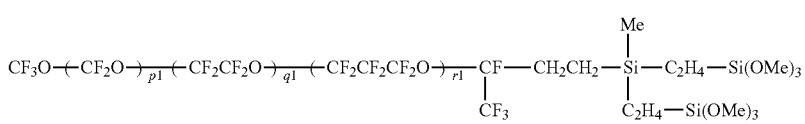

[Chem. 60]
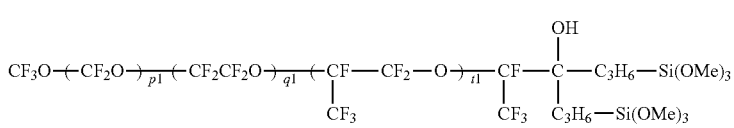

[Chem. 61]
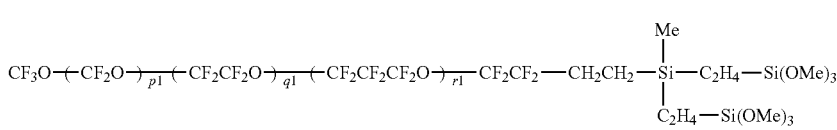

[Chem. 62]
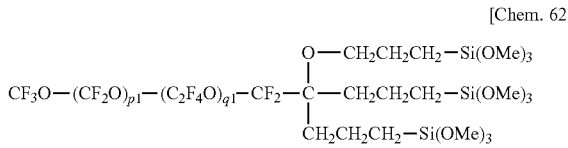

[Chem. 63]
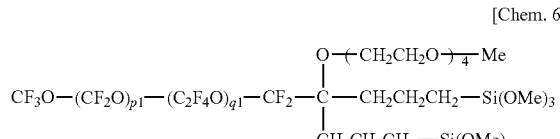

[Chem. 64]
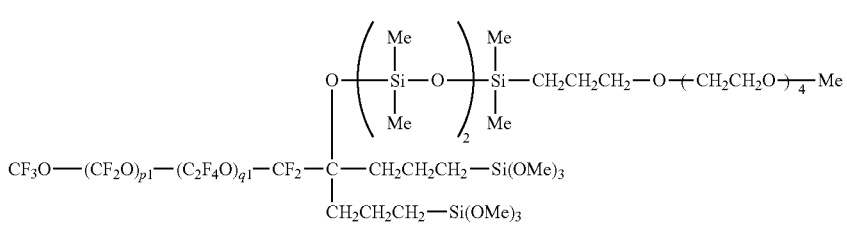

-continued
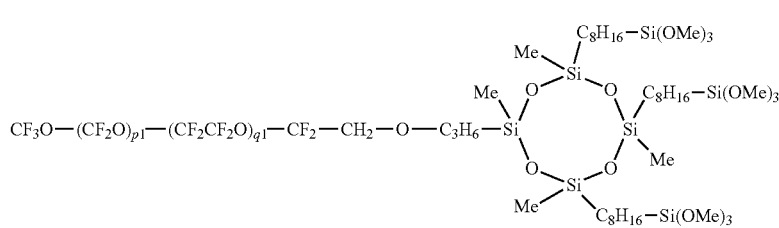
[Chem. 65]
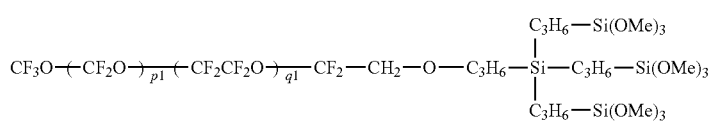
[Chem. 66]
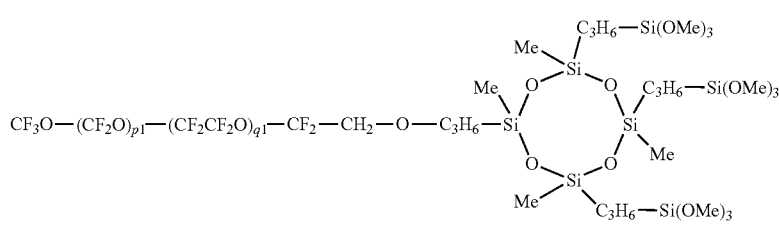
[Chem. 67]
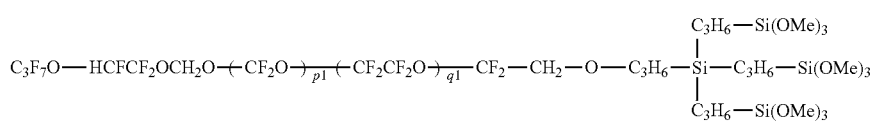
[Chem. 68]
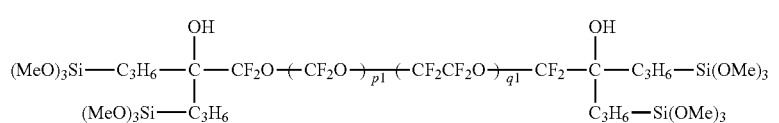
[Chem. 69]
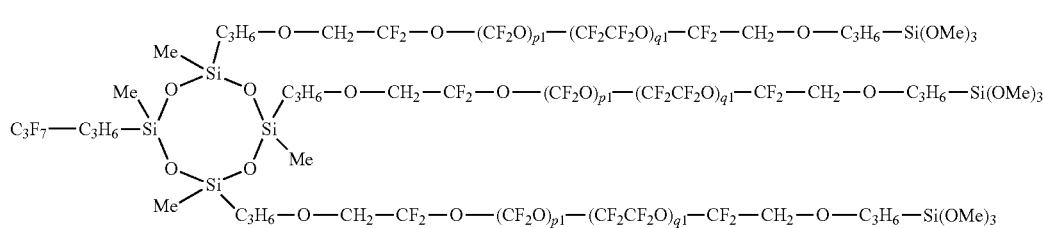
[Chem. 70]
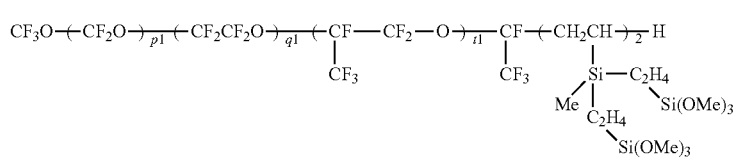
[Chem. 71]
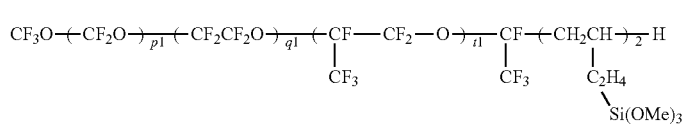
[Chem. 72]
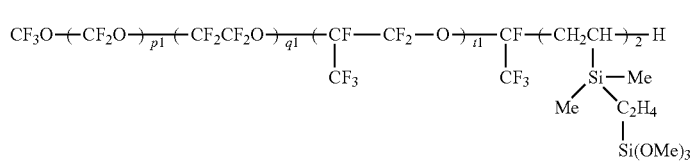
[Chem. 73]

-continued

[Chem. 74]
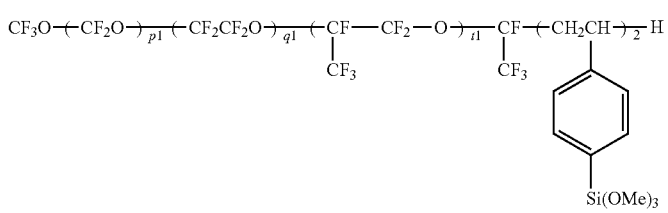

[Chem. 75]
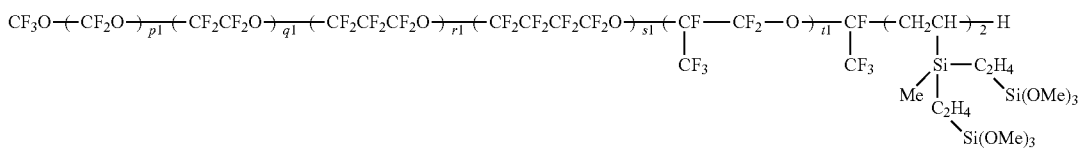

[Chem. 76]
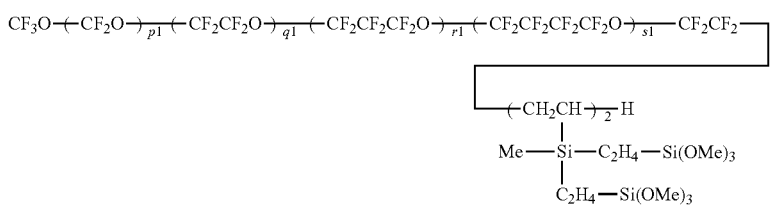

[Chem. 77]
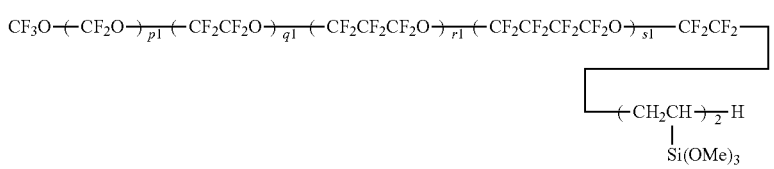

[Chem. 78]
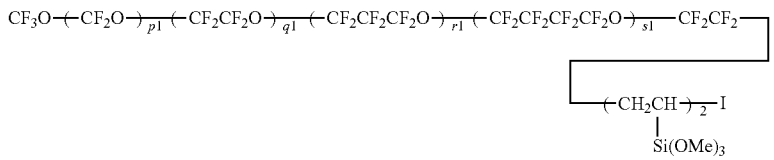

[Chem. 79]
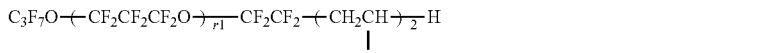

[Chem. 80]
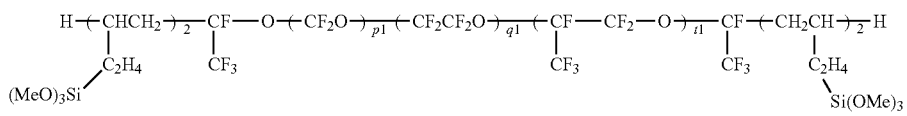

wherein Me is a methyl group, p1, q1, r1, s1, and t1 are each independently an integer of 1 to 200, the sum of p1, q1, r1, s1, and t1 is 3 to 500, and each of repeating units shown in parentheses appended with p1, q1, r1, s1, and t1 may be randomly arranged.

It is to be noted that the fluorine-containing hydrolyzable organosilicon compounds having the general formulae (1) to (5) (fluorooxyalkylene group-containing hydrolyzable organosilicon compounds) according to the present invention may contain a compound in which a part or all of the hydrolyzable groups (X) are hydrolyzed (a compound in which X is an OH group), or may contain a compound in which a part or all of the OH groups are condensed.

The hydrolyzable fluorine-containing compound is desirably diluted with a solvent in advance, and such a solvent is not particularly limited as long as it uniformly dissolves the hydrolyzable fluorine-containing compound. Examples thereof include fluorine-modified aliphatic hydrocarbon-based solvents (such as perfluoroheptane and perfluorooctane), fluorine-modified aromatic hydrocarbon-based solvents (such as 1,3-trifluoromethylbenzene), fluorine-modified ether-based solvents (such as methyl perfluorobutyl ether, ethyl perfluorobutyl ether, and perfluoro(2-butyltetrahydrofuran)), fluorine-modified alkylamine-based solvents (such as perfluorotributylamine and perfluorotripentylamine), hydrocarbon-based solvents (such as petroleum benzine, toluene, and xylene), and ketone-based solvents (such as acetone, methyl ethyl ketone, and methyl isobutyl ketone). Among them, fluorine-modified solvents are desired, and fluorine-modified ether-based solvents and fluorine-modified aromatic hydrocarbon-based solvents are particularly preferred, from the viewpoint of solubility and stability. The solvents may be used singly or in a mixture of two or more kinds thereof.

The solvent is desirably contained so as to have 0.01 to 50 wt %, preferably 0.03 to 10 wt %, and further preferably 0.05 to 1 wt % of the hydrolyzable fluorine-containing compound in a water/oil-repellent agent (a solution containing a hydrolyzable fluorine-containing compound and a solvent).

The water/oil-repellent agent containing the hydrolyzable fluorine-containing compound can be applied to the substrate by a known method such as a wet coating method (immersion method, brush coating, spin coating, spray, gravure coating, die coating, bar coating, slit coating) or a vapor deposition method. Coating conditions and the like may be in accordance with a conventionally known method, but since the primer layer is applied and formed by a wet coating method (wet method), it is more efficient that the water/oil-repellent agent containing the hydrolyzable fluorine-containing compound is also applied by the wet coating method (wet method).

The hydrolyzable fluorine-containing compound can be cured at room temperature (25° C.) for 1 to 24 hours, but may be heated at 30 to 200° C. for 1 minute to 1 hour in order to cure the compound in a shorter time. Curing is preferably performed under humidification (50 to 90% RH) in order to promote hydrolysis.

Before coating the water/oil-repellent agent containing the hydrolyzable fluorine-containing compound, the surface of the primer layer on the substrate may be subjected to cleaning such as plasma treatment, UV treatment or ozone treatment, or treatment for activating the surface.

The film thickness of the fluorine layer of the water/oil-repellent member (water/oil-repellent layer) of the present invention is 0.5 to 30 nm, and particularly preferably 1 to 20 nm. If the film thickness is too thick, the treatment agent may aggregate to deteriorate visibility, and if the film thickness is too thin, surface characteristics and abrasion resistance may not be sufficient.

Examples of the water/oil-repellent member of the present invention obtained in this manner include housings for car navigation, tablet PC, smartphone, digital camera, digital video camera, PDA, portable audio player, car audio, game equipment and the like, lenses such as camera lenses, eyeglass lenses, sunglasses, AR lens and VR lens, medical instruments such as endoscopes, scalpels, sphygmomanometers, X-ray CT and MRI, touch panels for liquid crystal displays, organic EL displays, flexible devices and the like, protective films, antireflection films, optical articles such as compact discs, DVD and Blu-ray discs, water section equipment such as shower heads, mirrors, bathtubs, washstands and toilets, kitchen equipment such as kitchen tables, sinks, faucets and grease filters, window glasses, headlamp covers and the like of automobiles, trains, aircrafts and the like, building materials for outer walls, building materials for kitchen, waiting rooms, works of art, bodies of transportation equipment, aluminum wheels, mirrors, covers for millimeter wave sensor, and the like.

EXAMPLES

Hereinafter, the present invention is described specifically with reference to Examples and Comparative Examples, but the present invention is not limited thereto. In the following Examples, the primary particle size of the nanodiamond is a value measured by a laser scattering method, the film thickness of the primer layer is a value obtained by calculating an average film thickness by fluorescent X-ray, and Me represents a methyl group. In addition, the weight average molecular weight of the hydrolyzed partial condensate of tetraethoxysilane indicates a polystyrene-equivalent value in GPC analysis using toluene as a developing solvent.

Examples 1 and 2, and Comparative Examples 1 to 3

As described below, test bodies of water/oil-repellent materials having a primer layer and a water/oil-repellent layer on one outer surface of a substrate were prepared.
[Substrate]
SUS 304 Substrate (manufactured by Standard Testpiece Co., Ltd., Stainless steel SUS 304, a test piece substrate having a thickness of 2 mm, a width of 50 mm, and a length of 100 mm).
[Formation of Primer Layer]
Primer Layers 1 to 4 were each formed on one outer surface of the SUS 304 substrate by the method shown below.
[Formation of Primer Layer 1]
The substrate was dip-coated with a treatment liquid in which nanodiamond (primary particle size: 4 to 6 nm, manufactured by Carbodeon, trade name: VoxD) was added to a solution obtained by diluting a hydrolyzed partial condensate of tetraethoxysilane (weight average molecular weight: 25,000, amount of silanol groups: 0.01 mol/g) with butanol to a solid content of 0.5 wt % so as to have 0.005 wt % of nanodiamond, and then dried at room temperature (25° C.) for 1 hour to form Primer Layer 1 having a thickness of 20 nm on the outer surface of the substrate. In the dipping coating, the substrate was immersed in the treatment liquid for 30 seconds, and then pulled up at 150 mm/min.
[Formation of Primer Layer 2]
The substrate was dip-coated with a treatment liquid in which nanodiamond (primary particle diameter: 4 to 6 nm, manufactured by Carbodeon, trade name: VoxD) was added to a solution obtained by diluting a hydrolyzed partial condensate of tetraethoxysilane (weight average molecular weight: 25,000, amount of silanol groups: 0.01 mol/g) with butanol to a solid content of 0.5 wt % so as to have 0.05 wt % of nanodiamond, and then dried at room temperature (25° C.) for 1 hour to form Primer Layer 2 having a thickness of 20 nm on the outer surface of the substrate. In the dipping coating, the substrate was immersed in the treatment liquid for 30 seconds, and then pulled up at 150 mm/min.
[Formation of Primer Layer 3]
The substrate was dip-coated with a treatment liquid obtained by diluting a hydrolyzed partial condensate of tetraethoxysilane (weight average molecular weight: 25,000, amount of silanol groups: 0.01 mol/g) with butanol to a solid content of 0.5 wt %, and then dried at room temperature (25° C.) for 1 hour to form Primer Layer 3 having a thickness of 20 nm on the outer surface of the substrate. In the dipping coating, the substrate was immersed in the treatment liquid for 30 seconds, and then pulled up at 150 mm/min.
[Formation of Primer Layer 4]
The substrate was dip-coated with a treatment liquid obtained by diluting perhydropolysilazane with dibutyl ether to a solid content of 0.5 wt %, and then cured at 80° C./80% RH for 24 hours to form Primer Layer 4 having a thickness of 23 nm on the outer surface of the substrate. In the dipping coating, the substrate was immersed in the treatment liquid for 30 seconds, and then pulled up at 150 mm/min.

Further, a water/oil-repellent layer was formed and laminated on the outer surface of the primer layer of each substrate on which each of Primer Layers 1 to 4 were formed, on the basis of the following method.

[Formation of Water/Oil-Repellent Layer]

Compound 1 shown below was diluted with a fluorine-based solvent (Novec 7200 (ethyl perfluorobutyl ether manufactured by 3M)) so as to have a solid content of 0.1 wt %, and then spray coated on the primer layer of the substrate with a spray coater (manufactured by T&K Co., Ltd., NST-51). Thereafter, the coating was cured at 80° C. for 30 minutes to form a cured film (water/oil-repellent layer) to prepare a test body. The average film thickness of the water/oil-repellent layer calculated from the amount of F detected by an X-ray fluorescence analyzer (manufactured by Rigaku Corporation, ZSXmini2) was about 10 nm.

[Compound 1]

[Chem. 81]

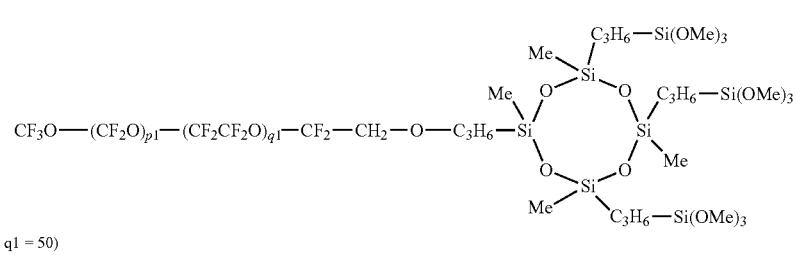

$CF_3O\text{---}(CF_2O)_{p1}\text{---}(CF_2CF_2O)_{q1}\text{---}CF_2\text{---}CH_2\text{---}O\text{---}C_3H_6\text{---}Si$ (p1 + q1 = 50)

Note that, a substrate on which Primer Layer 1 was formed, a substrate on which Primer Layer 2 was formed, a substrate on which Primer Layer 3 was formed, a substrate on which Primer Layer 4 was formed were used in Example 1, Example 2, Comparative Example 1, and Comparative Example 2, respectively. Also, in Comparative Example 3, a water/oil-repellent layer was formed directly on the SUS 304 substrate by the above method without forming a primer layer. Using the test bodies obtained above, various evaluations were performed by the following methods. These results are shown in Table 1.

[Water/Oil-Repellent Property]

Contact angle with water of the cured film (water/oil-repellent layer) and contact angle with oleic acid were measured using a contact angle meter (DropMaster, manufactured by Kyowa Interface Science Co., Ltd.).

[Sebum Stain Wipe-Off]

Seven panelists transferred sebum on their forehead to the surface of the cured film (water/oil-repellent layer) with the finger, wiped-off the sebum with BEMCOT (manufactured by Asahi Kasei Corp.), and evaluated wipe-off according to the following criteria.

A: sebum can be completely wiped-off within 2 times

B: sebum can be completely wiped-off within 3 to 5 times

C: some sebum cannot be wiped-off and remains after 5 wipes

D: no sebum can be wiped-off after 5 wipes

[Abrasion Resistance Test]

Using a both-way wear tester (Heidon 30S, manufactured by Shinto Scientific Co., Ltd.), an abrasion resistance test of the cured film (water/oil-repellent layer) was performed under the following conditions. The contact angle with water of the cured film (water/oil-repellent layer) after the abrasion resistance test was measured using a contact angle meter (DropMaster, manufactured by Kyowa Interface Science Co., Ltd.).

Evaluation environmental conditions: 25° C., humidity 40%

Rubbing material: CS-5 felt (manufactured by Taber Industries)

Load: 1 kg

Rubbing distance (one way): 30 mm

Rubbing speed: 3,600 mm/min

Number of reciprocations: 2,000 cycles

TABLE 1

|  | Primer layer | Water/oil-repellent property | | Sebum stain wipe-off | Abrasion resistance test Water contact angle (°) |
|---|---|---|---|---|---|
|  |  | Water contact angle (°) | Oleic acid contact angle (°) |  |  |
| Example 1 | 1 | 116 | 72 | A | 108 |
| Example 2 | 2 | 114 | 70 | A | 111 |
| Comparative Example 1 | 3 | 116 | 73 | A | 94 |
| Comparative Example 2 | 4 | 116 | 72 | A | 97 |
| Comparative Example 3 | None | 111 | 68 | B | 56 |

As is apparent from the results in Table 1, Examples 1 and 2 in which the primer layer containing nanodiamond was used had excellent water/oil-repellent property, and exhibited excellent water/oil-repellent property at a water contact angle of 100° or more even before and after the abrasion resistance test. On the other hand, in Comparative Example 1 in which a primer free of nanodiamond was used, the abrasion resistance was poor. In Comparative Example 2, a typical perhydropolysilazane was used in wet coating of a silica film, but the abrasion resistance was insufficient. In Comparative Example 3, when no primer was used, sufficient performance was not exhibited. The silanol group had good adhesion to the substrate and excellent reactivity with a fluorine-containing compound having a hydrolyzable group, and by containing nanodiamond, an anti-fouling film having excellent abrasion resistance could be formed.

INDUSTRIAL APPLICABILITY

According to the present invention, a water/oil-repellent member having a cured film (water/oil-repellent layer) having excellent water/oil-repellent property can be formed only by wet coating by a room temperature process or a process within a temperature range that does not adversely affect a substrate. Furthermore, the present invention is a technique that enables application also to a component having a large area or a three-dimensional shape. Therefore, the water/oil-repellent member of the present invention enables automobiles and plumbing components having complicated shapes, and functional films produced in the form of rolls, and can maintain a good anti-fouling surface over a long period of time in even those which are frequently used and touched on a daily basis such as housings of electronic devices and kitchen equipment.

The invention claimed is:

1. A water/oil-repellent member comprising:
    a primer layer as a first layer on at least one surface of a substrate; and
    a water/oil-repellent layer as a second layer on an outer surface of the primer layer,
    wherein the primer layer is composed of a layer having a film thickness of 0.5 to 500 nm which contains an organosilicon compound having a plurality of silanol groups in a molecule as a principal component and contains nanodiamond, and
    the water/oil-repellent layer is composed of a layer having a film thickness of 0.5 to 30 nm which contains a cured product of a hydrolyzable fluorine-containing compound as a principal component,
    wherein the primer layer is free of a film-forming resin, and the water/oil-repellent layer is free of nanodiamond.

2. The water/oil-repellent member according to claim 1, wherein the organosilicon compound having a plurality of silanol groups in a molecule is a hydrolyzed partial condensate of tetraalkoxysilane.

3. The water/oil-repellent member according to claim 1, wherein the hydrolyzable fluorine-containing compound is a fluorooxyalkylene group-containing hydrolyzable organosilicon compound having at least one hydrolyzable silyl group at at least one molecular chain terminal and having a divalent linear perfluorooxyalkylene polymer residue to which a plurality of one or more kinds of repeating units of —$C_jF_{2j}$O— (j is an integer of 1 or more) are arranged.

4. The water/oil-repellent member according to claim 3, wherein the hydrolyzable silyl group is a group selected from the group consisting of alkoxy groups having 1 to 12 carbon atoms, alkoxyalkoxy groups having 2 to 12 carbon atoms, acyloxy groups having 1 to 10 carbon atoms, alk-enyloxy groups having 2 to 10 carbon atoms, silyl groups having a halogen group or an amino group, and a silazane group.

5. The water/oil-repellent member according to claim 3, wherein the divalent linear perfluorooxyalkylene polymer residue is a group of —$(CF_2)_d$—O—$(CF_2O)_p(CF_2CF_2O)_q$ $(CF_2CF_2CF_2O)_r(CF_2CF_2CF_2CF_2O)_s(CF(CF_3)CF_2O)_t$— $(CF_2)_d$—, wherein p, q, r, s, and t are each independently an integer of 0 to 200, p+q+r+s+t is 3 to 500, each of repeating units shown in parentheses appended with p, q, r, s, and t may be randomly arranged, d is independently an integer of 0 to 8, and the unit may be linear or branched.

6. The water/oil-repellent member according to claim 1, wherein the hydrolyzable fluorine-containing compound is at least one selected from fluorine-containing hydrolyzable organosilicon compounds having the following general formulas (1) to (5):

$$(A\text{-}Rf)_\alpha ZW_\beta \tag{1}$$

$$Rf\text{-}(ZW_\beta)_2 \tag{2}$$

$$Z'\text{—}(Rf\text{-}ZW_\beta)_\gamma \tag{3}$$

wherein Rf is independently a divalent linear perfluorooxyalkylene polymer residue of —$(CF_2)_d$—O— $(CF_2O)_p(CF_2CF_2O)_q(CF_2CF_2CF_2O)_r$ $(CF_2CF_2CF_2CF_2O)_s(CF(CF_3)CF_2O)_t$—$(CF_2)_d$—, p, q, r, s, and t are each independently an integer of 0 to 200, p+q+r+s+t is 3 to 500, each of repeating units shown in parentheses appended with p, q, r, s, and t may be randomly arranged, d is independently an integer of 0 to 8, and the unit may be linear or branched, A is independently a fluorine atom, a hydrogen atom, or a monovalent fluorine-containing group whose terminal is a —$CF_3$ group, a —$CF_2H$ group or a —$CH_2F$ group, Z and Z' are independently a single bond, or a 2- to 8-valent organic group which may contain a nitrogen atom, an oxygen atom, a silicon atom, a phosphorus atom or a sulfur atom and may be substituted with fluorine, and W is independently a monovalent organic group having a hydrolyzable group at the terminal, α and β are each independently an integer of 1 to 7 and α+β is an integer of 2 to 8, and γ is an integer of 2 to 8, $$A\text{-}Rf\text{-}Q\text{-}(Y)_\delta\text{-}B \tag{4}$$

$$Rf\text{-}(Q\text{-}(Y)_\delta\text{-}B)_2 \tag{5}$$

wherein Rf and A are the same as described above, Q is independently a single bond or a divalent organic group, δs are each independently an integer of 1 to 10, Y is independently a divalent organic group having a hydrolyzable group, and B is independently a hydrogen atom, an alkyl group having 1 to 4 carbon atoms, or a halogen atom.

7. The water/oil-repellent member according to claim 6, wherein the fluorine-containing hydrolyzable organosilicon compounds having the formulas (1) to (5) are those shown below:

[Chem. 1]

$$CF_3O-(CF_2CF_2O)_{q1}-(CF_2CF_2CF_2CF_2O)_{s1}-CF_2CF_2CF_2-C_2H_4-Si(OMe)_3$$

-continued
[Chem. 2]
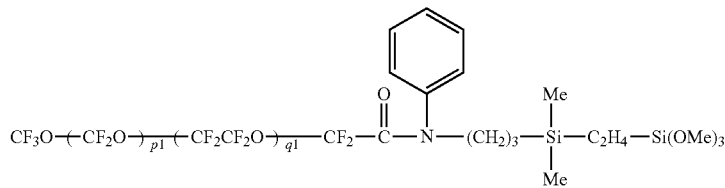
[Chem. 3]
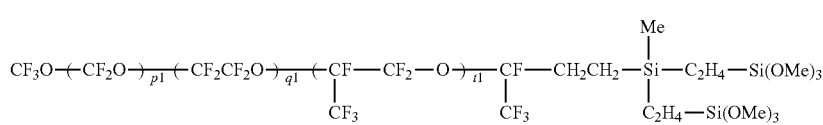
[Chem. 4]
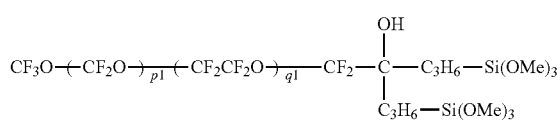
[Chem. 5]
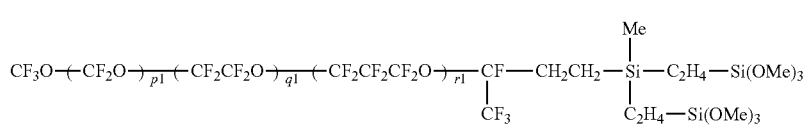
[Chem. 6]
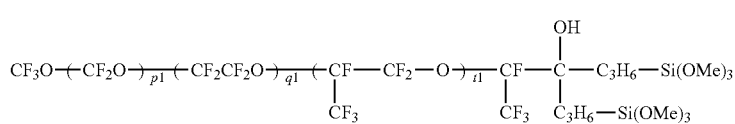
[Chem. 7]
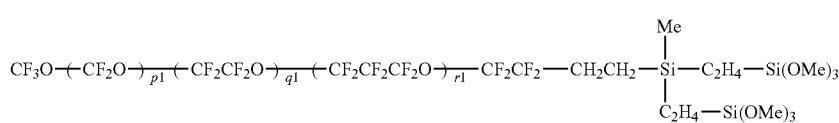
[Chem. 8]
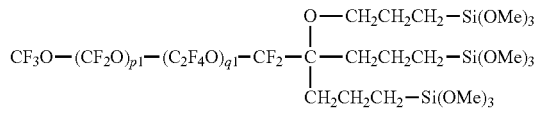
[Chem. 9]
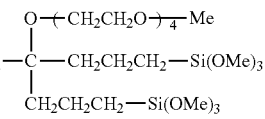
[Chem. 10]
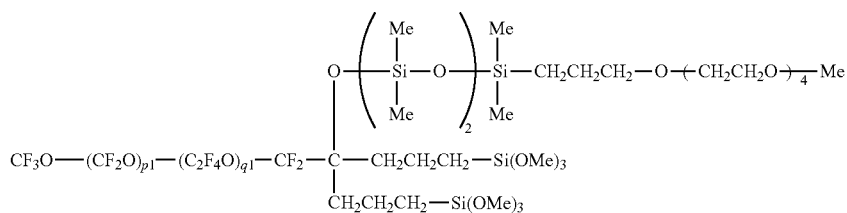
[Chem. 11]
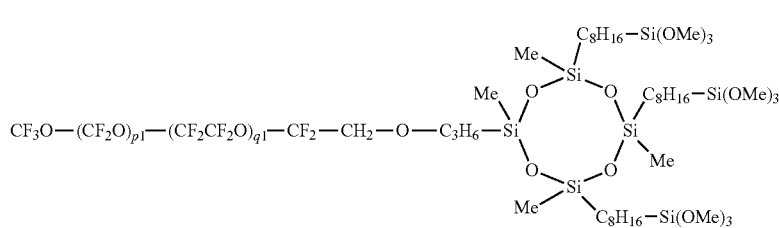
[Chem. 12]
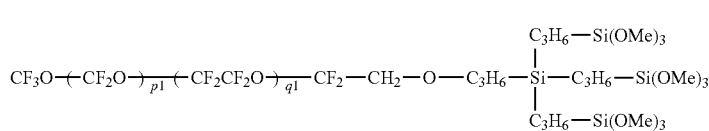

-continued
[Chem. 13]
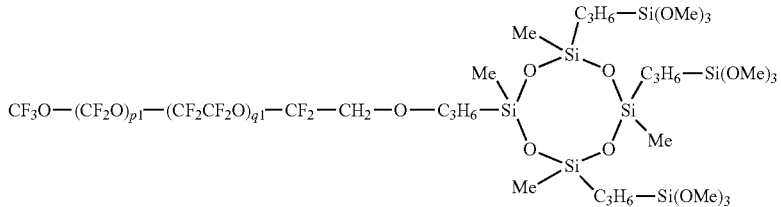
[Chem. 14]
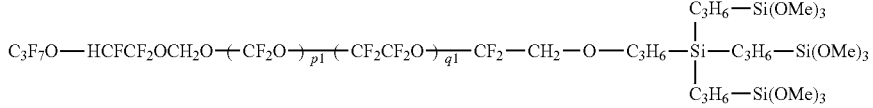
[Chem. 15]
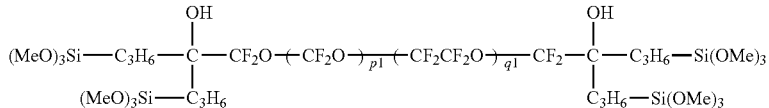
[Chem. 16]
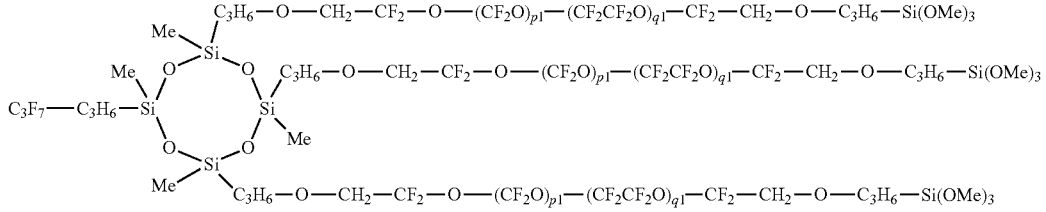
[Chem. 17]
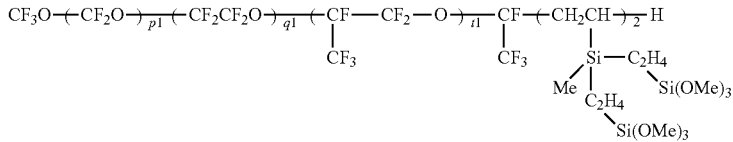
[Chem. 18]
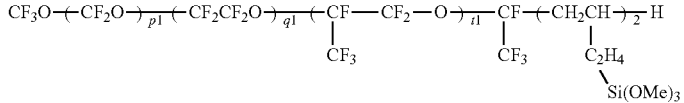
[Chem. 19]
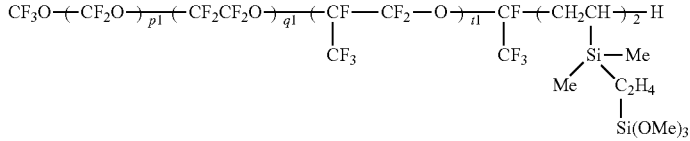
[Chem. 20]
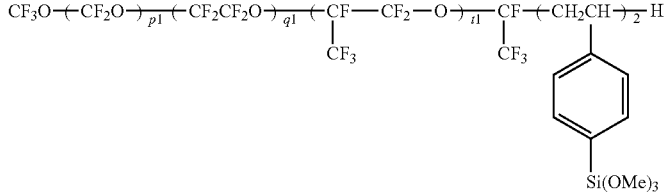
[Chem. 21]
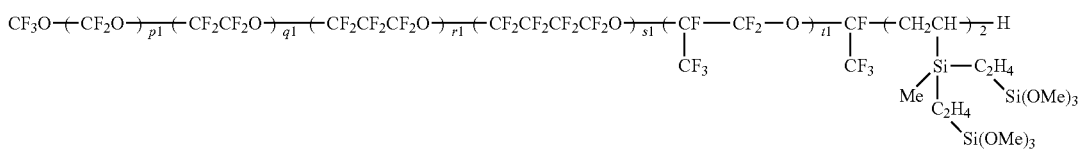

[Chem. 22]
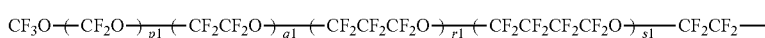
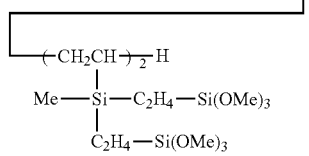

[Chem. 23]
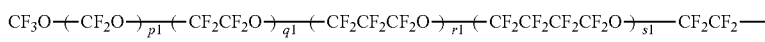
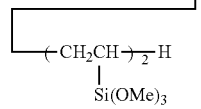

[Chem. 24]
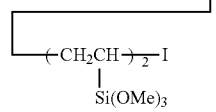

[Chem. 25]
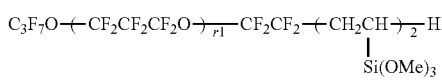

[Chem. 26]
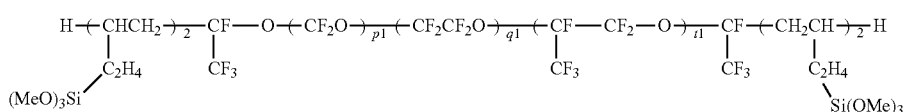

wherein Me is a methyl group, p1, q1, r1, s1, and t1 are each independently an integer of 1 to 200, the sum of p1, q1, r1, s1, and t1 is 3 to 500, and each of repeating units shown in parentheses appended with p1, q1, r1, s1, and t1 may be randomly arranged.

8. The water/oil-repellent member according to claim 1, wherein the substrate is metal oxide, metal, resin, ceramic, quartz, glass, sapphire, or diamond.

9. A method for producing the water/oil-repellent member according to claim 1, the method comprising steps of:
wet-coating a solution containing an organosilicon compound having a plurality of silanol groups in a molecule, nanodiamond, and a solvent on at least one surface of a substrate, wherein the solution for the primer layer is free of the film-forming resin;
drying the solvent to form and laminate a primer layer on at least one surface of the substrate;
wet-coating a solution containing a hydrolyzable fluorine-containing compound and a solvent on an outer surface of the primer layer, wherein the solution for the water/oil-repellent layer is free of the nanodiamond, and then drying the solvent, or dry-coating a hydrolyzable fluorine-containing compound obtained by evaporating the solvent from the solution; and
curing the hydrolyzable fluorine-containing compound to form and laminate a water/oil-repellent layer on the outer surface of the primer layer.

10. The water/oil-repellent member according to claim 1, wherein the nanodiamond has a primary particle diameter of 1 to 30 nm.

11. The water/oil-repellent member according to claim 1, wherein the content of the nanodiamond in the primer layer is 0.1 to 20 wt % with respect to the organosilicon compound having a plurality of silanol groups in a molecule.

12. The method according to claim 9, wherein the nanodiamond has a primary particle diameter of 1 to 30 nm.

13. The method according to claim 9, wherein a content of the nanodiamond in the solution for the primer layer is 0.1 to 20 wt % with respect to the organosilicon compound having the plurality of silanol groups in the molecule.

* * * * *